US012640029B2

(12) United States Patent
Andrzejewski et al.

(10) Patent No.: US 12,640,029 B2
(45) Date of Patent: May 26, 2026

(54) ALERT RESPONSE TOOL

(71) Applicant: Sumo Logic, Inc., Redwood City, CA (US)

(72) Inventors: David M. Andrzejewski, San Francisco, CA (US); Bashyam Tca, Walnut Creek, CA (US); Apoorv Garg, Delhi (IN); Ryley Sk Higa, Honolulu, HI (US); Naveen Ramachandrappa, Redwood City, CA (US)

(73) Assignee: Sumo Logic, Inc., Redwood City, CA (US)

( * ) Notice: Subject to any disclaimer, the term of this patent is extended or adjusted under 35 U.S.C. 154(b) by 38 days.

(21) Appl. No.: 18/809,044

(22) Filed: Aug. 19, 2024

(65) Prior Publication Data

US 2024/0412620 A1 Dec. 12, 2024

Related U.S. Application Data

(63) Continuation of application No. 18/055,568, filed on Nov. 15, 2022, now Pat. No. 12,106,658.
(Continued)

(51) Int. Cl.
*G08B 26/00* (2006.01)

(52) U.S. Cl.
CPC ......... *G08B 26/008* (2013.01); *G08B 26/003* (2013.01)

(58) Field of Classification Search
CPC ... G08B 26/003; G08B 26/008; G06F 11/327; G06F 11/3051; G06F 11/3476; H04L 63/1425
See application file for complete search history.

(56) References Cited

U.S. PATENT DOCUMENTS 8,738,425 B1 * 5/2014 Basu ................ G06Q 10/06375 705/7.38
11,366,842 B1 * 6/2022 Swaminathan ..... G06F 16/2477
(Continued)

FOREIGN PATENT DOCUMENTS

WO WO-2024073162 A1 4/2024

OTHER PUBLICATIONS

"U.S. Appl. No. 18/055,568, Non Final Office Action mailed May 10, 2024", 21 pgs.
(Continued)

*Primary Examiner* — Mirza F Alam
(74) *Attorney, Agent, or Firm* — Schwegman Lundberg & Woessner, P.A.

(57) ABSTRACT

Methods, systems, and computer programs are presented to generate response information for an alert. One method includes an operation for detecting an alert based on incoming log data or metric data and for calculating information for panels to be presented on a response-alert page. Calculating the information includes calculating first performance values for a period associated with the alert, calculating second performance values for a background period where the alert condition was not present, and calculating a difference between the first performance values and the second performance values. Further, the method includes an operation for selecting, based on the difference, relevant performance values for presentation in one of the panels. The response-alert page is presented with at least one of the panels based on the selected relevant performance values.

20 Claims, 24 Drawing Sheets

Related U.S. Application Data

(60) Provisional application No. 63/410,993, filed on Sep. 28, 2022.

(56) References Cited

U.S. PATENT DOCUMENTS

| | | | | |
|---|---|---|---|---|
| 2011/0119100 | A1* | 5/2011 | Ruhl | G06F 16/958 705/7.11 |
| 2016/0092890 | A1* | 3/2016 | Bhamidipati | G06Q 30/0246 705/7.29 |
| 2016/0103883 | A1* | 4/2016 | Ramani | G06F 16/24573 707/725 |
| 2017/0236060 | A1* | 8/2017 | Ignatyev | G06N 5/01 706/46 |
| 2022/0237102 | A1* | 7/2022 | Bugdayci | G06F 11/327 |
| 2024/0105050 | A1 | 3/2024 | Andrzejewski et al. | |

OTHER PUBLICATIONS

"U.S. Appl. No. 18/055,568, Notice of Allowance mailed Jul. 5, 2024", 9 pgs.
"U.S. Appl. No. 18/055,568, Response filed Jun. 12, 2024 to Non Final Office Action mailed May 10, 2024", 15 pgs.
"International Application Serial No. PCT/US2023/069507, International Search Report mailed Oct. 23, 2023", 3 pgs.
"International Application Serial No. PCT/US2023/069507, Written Opinion mailed Oct. 23, 2023", 4 pgs.
"International Application Serial No. PCT US2023 069507, International Preliminary Report on Patentability mailed Apr. 10, 2025", 6 pgs.
"European Application Serial No. 23751193.6, Response to Communication pursuant to Rules 1612 and 162 EPC filed Sep. 9, 2025", 8 pages.

* cited by examiner

ALERT RESPONSE TOOL

CROSS-REFERENCE TO RELATED APPLICATIONS

This application is a Continuation Application under 35 USC § 120 of U.S. patent application Ser. No. 18/055,568, entitled "Alert Response Tool," filed on Nov. 15, 2022, which claims the benefit of U.S. Provisional Patent Application No. 63/410,993, filed Sep. 28, 2022, which applications are incorporated by reference herein in their entireties.

This application is related by subject matter to U.S. patent application Ser. No. 16/031,749, filed Jul. 10, 2018, entitled "Data Enrichment and Augmentation," application Ser. No. 17/009,643, filed Sep. 1, 2020, entitled "Clustering of Structured Log Data by Key Schema," and application Ser. No. 15/620,439, filed Jun. 12, 2017, entitled "Cybersecurity Incident Response and Security Operation System Employing Playbook Generation Through Custom Machine Learning," all of which are incorporated herein by reference in their entirety.

TECHNICAL FIELD

The subject matter disclosed herein generally relates to methods, systems, and machine-readable storage media for facilitating the troubleshooting of computer-generated alerts.

BACKGROUND

On-call engineers are tasked with troubleshooting production issues and finding solutions to recover from malfunctions quickly, having to investigate issues and identify their root causes, which requires deep knowledge about production systems, troubleshooting tools, and diagnosis experience.

Problems are often detected when alerts are generated by the monitoring systems that inform about problems with systems, services, or applications associated with the company products and services. The on-call engineer receives a communication (e.g., an email, a text alert) that there is trouble (e.g., high latency in response time for a critical service), and the engineer must find the problem quickly, sometimes by examining a large pool of information, such as thousands of log messages.

There is often pressure to resolve the problem quickly, as having the system down or operating inefficiently may cost the company large amounts of money (e.g., when the shopping-cart service on a web store is not working properly). However, analyzing thousands of log messages may be time consuming and it can be difficult to pinpoint the source of the problem, as there can be errors which originated down the line for services that are impacted by a malfunctioning system.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to generate response information for an alert. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An alert-response page provides contextual insights about triggered alerts to minimize the time needed to investigate and resolve application and system failures. The alert-response page assembles relevant context (e.g., based on history and analysis of prior alerts) and identifies patterns in logs and metrics underlying the alerts. The information in the alert-response page enables on-call engineers to cut down the problem-resolution time that requires piecing together insights during an incident from various sources.

One general aspect includes a method that includes operations for detecting an alert based on incoming log data or metric data and for calculating information for a plurality of panels to be presented on a response-alert page. Calculating the information includes calculating first performance values for a period associated with the alert, calculating second performance values for a background period where the alert condition was not present, and calculating a difference between the first performance values and the second performance values. Further, the method includes an operation for selecting, based on the difference, relevant performance values for presentation in one of the plurality of panels. The response-alert page is presented with at least one of the plurality of panels based on the selected relevant performance values.

Figure 1:
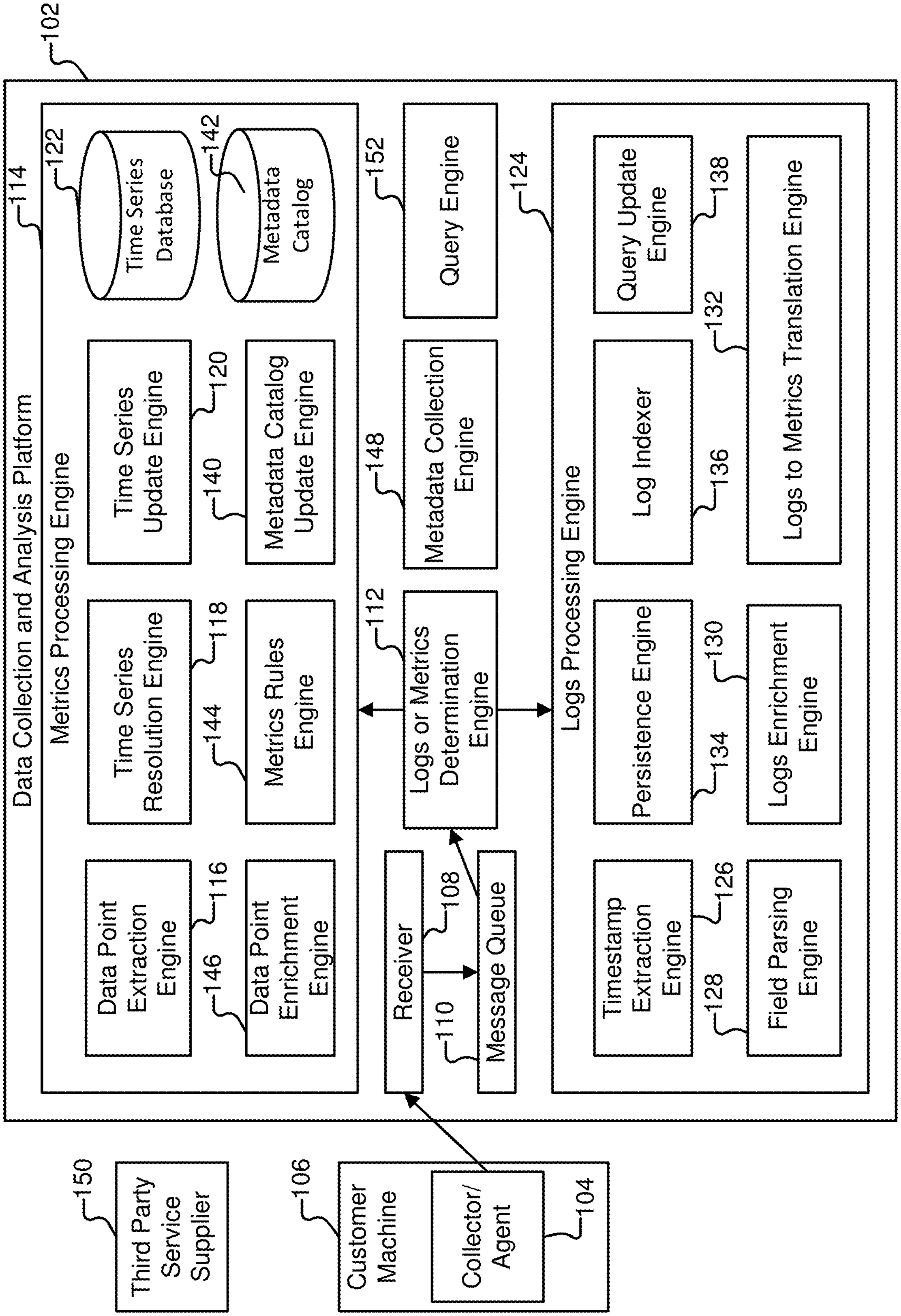
FIG. 1 illustrates an embodiment of an environment in which machine data collection and analysis is performed.

FIG. 1 illustrates an embodiment of an environment in which machine data collection and analysis is performed. In this example, data collection and analysis platform 102 (also referred to herein as the "platform" or the "system") is configured to ingest and analyze machine data (e.g., log messages and metrics) collected from customers (e.g., entities utilizing the services provided by the data collection and analysis platform 102). For example, collectors (e.g., collector/agent 104 installed on machine 106 of a customer) send log messages to the platform over a network (such as the Internet, a local network, or any other type of network, as appropriate); customers may also send logs directly to an endpoint such as a common HTTPS endpoint. Collectors can also send metrics, and likewise, metrics can be sent in common formats to the HTTPS endpoint directly. In some embodiments, metrics rules engine 144 is a processing stage (that may be user guided) that can change existing metadata or synthesize new metadata for each incoming data point.

As used herein, log messages and metrics are but two examples of machine data that may be ingested and analyzed by the data collection and analysis platform 102 using the techniques described herein. Collector/Agent 104 may also be configured to interrogate machine 106 directly to gather various host metrics such as CPU (central processing unit) usage, memory utilization, etc.

Machine data, such as log data and metrics, are received by receiver 108, which, in one example, is implemented as a service receiver cluster. Logs are accumulated by each receiver into bigger batches before being sent to message queue 110. In some embodiments, the same batching mechanism applies to incoming metrics data points as well.

The batches of logs and metrics data points are sent from the message queue to logs or metrics determination engine 112. Logs or metrics determination engine 112 is configured to read batches of items from the message queue and determine whether the next batch of items read from the message queue is a batch of metrics data points or whether the next batch of items read from the message queue is a batch of log messages. For example, the determination of what machine data is log messages or metrics data points is based on the format and metadata of the machine data that is received.

In some embodiments, a metadata index (stored, for example, as metadata catalog 142 of platform 102) is also updated to allow flexible discovery of time series based on their metadata. In some embodiments, the metadata index is a persistent data structure that maps metadata values for keys to a set of time series identified by that value of the metadata key.

For a collector, there may be different types of sources from which raw machine data is collected. The type of source may be used to determine whether the machine data is logs or metrics. Depending on whether a batch of machine data includes log messages or metrics data points, the batch of machine data will be sent to one of two specialized backends, metrics processing engine 114 and logs processing engine 124, which are optimized for processing log messages and metrics data points, respectively.

When the batch of items read from the message queue is a batch of metrics data points, the batch of items is passed downstream to metrics processing engine 114. Metrics processing engine 114 is configured to process metrics data points, including extracting and generating the data points from the received batch of metrics data points (e.g., using data point extraction engine 116). Time series resolution engine 118 is configured to resolve the time series for each data point given data point metadata (e.g., metric name, identifying dimensions). Time series update engine 120 is configured to add the data points to the time series (stored in this example in time series database 122) in a persistent fashion.

If logs or metrics determination engine 112 determines that the batch of items read from the message queue is a batch of log messages, the batch of log messages is passed to logs processing engine 124. Logs processing engine 124 is configured to apply log-specific processing, including timestamp extraction (e.g., using timestamp extraction engine 126) and field parsing using extraction rules (e.g., using field parsing engine 128). Other examples of processing include further augmentation (e.g., using logs enrichment engine 130).

The ingested log messages and metrics data points may be directed to respective log and metrics processing backends that are optimized for processing the respective types of data. However, there are some cases in which information that arrived in the form of a log message would be better processed by the metrics backend than the logs backend. One example of such information is telemetry data, which includes, for example, measurement data that might be recorded by an instrumentation service running on a device. In some embodiments, telemetry data includes a timestamp and a value. The telemetry data represents a process in a system. The value relates to a numerical property of the process in question. For example, a smart thermostat in a house has a temperature sensor that measures the temperature in a room on a periodic basis (e.g., every second). The temperature measurement process therefore creates a timestamp-value pair every second, representing the measured temperature of that second.

Telemetry may be efficiently stored in, and queried-from, a metrics time series store (e.g., using metrics backend 114) than by abusing a generic log message store. By doing so, customers utilizing the data collection and analysis platform 102 can collect host metrics such as CPU usage directly using, for example, a metrics collector. In this case, the collected telemetry is directly fed into the optimized metrics time series store (e.g., provided by metrics processing engine 114). The system can also at the collector level interpret a protocol, such as the common Graphite protocol, and send it directly to the metrics time series storage backend.

As another example, consider a security context, in which syslog messages may come in the form of CSV (comma separated values). However, storing such CSV values as a log would be inefficient, and it should be stored as a time series in order to better query that information. In some example embodiments, although metric data may be received in the form of a CSV text log, the structure of such log messages is automatically detected, and the values from the text of the log (e.g., the numbers between the commas) are stored in a data structure such as columns of a table, which better allows for operations such as aggregations of table values, or other operations applicable to metrics that may not be relevant to log text.

The logs-to-metrics translation engine 132 is configured to translate log messages that include telemetry data into metrics data points. In some embodiments, translation engine 132 is implemented as a service. In some embodiments, upon performing logs to metrics translation, if any of the matched logs-to-metrics rules indicates that the log message (from which the data point was derived) should be dropped, the log message is removed. Otherwise, the logs processing engine is configured to continue to batch log messages into larger batches to persist them (e.g., using persistence engine 134) by sending them to an entity such as Amazon S3 for persistence.

The batched log messages are also sent to log indexer 136 (implemented, for example, as an indexing cluster) for full-text indexing and query update engine 138 (implemented, for example, as a continuous query cluster) for evaluation to update streaming queries.

In some embodiments, once the data points are created in memory, they are committed to persistent storage such that a user can then query the information. In some embodiments, the process of storing data points includes two distinct parts and one asynchronous process. First, based on identifying metadata, the correct time series is identified, and the data point is added to that time series. In some embodiments, the time series identification is performed by time series resolution engine 118 of platform 102. Secondly, a metadata index is updated in order for users to more easily find time series based on metadata. In some embodiments, the updating of the metadata index (also referred to herein as a "metadata catalog") is performed by metadata catalog update engine 140.

Thus, the data collection and analysis platform 102, using the various backends described herein, is able to handle any received machine data in the most native way, regardless of the semantics of the data, where machine data may be represented, stored, and presented back for analysis in the most efficient way. Further, a data collection and analysis system, such as the data collection and analysis platform 102, has the capability of processing both logs and time series metrics, provides the ability to query both types of data (e.g., using query engine 152) and creates displays that combine information from both types of data visually.

The log messages may be clustered by key schema. Structured log data is received (it may have been received directly in structured form, or extracted from a hybrid log, as described above). An appropriate parser consumes the log, and a structured map of keys to values is output. All of the keys in the particular set for the log are captured. In some embodiments, the values are disregarded. Thus, for the one message, only the keys have been parsed out. That set of keys then goes into a schema which may be used to generate a signature and used to group the log messages. That is, the signature for logs in a cluster may be computed based on the unique keys the group of logs in the cluster contains. The log is then matched to a cluster based on the signature identifier. In some embodiments, the signature identifier is a hash of the captured keys. In some embodiments, each cluster that is outputted corresponds to a unique combination of keys. In some embodiments, when determining which cluster to include a log in, the matching of keys is exact, where the key schemas for two logs are either exactly the same or different.

In some embodiments, data point enrichment engine 146 and logs enrichment engine 130 are configured to communicate with metadata collection engine 148 in order to obtain, from a remote entity such as third party service supplier 150, additional data to enrich metrics data points and log messages, respectively.

Figure 2:
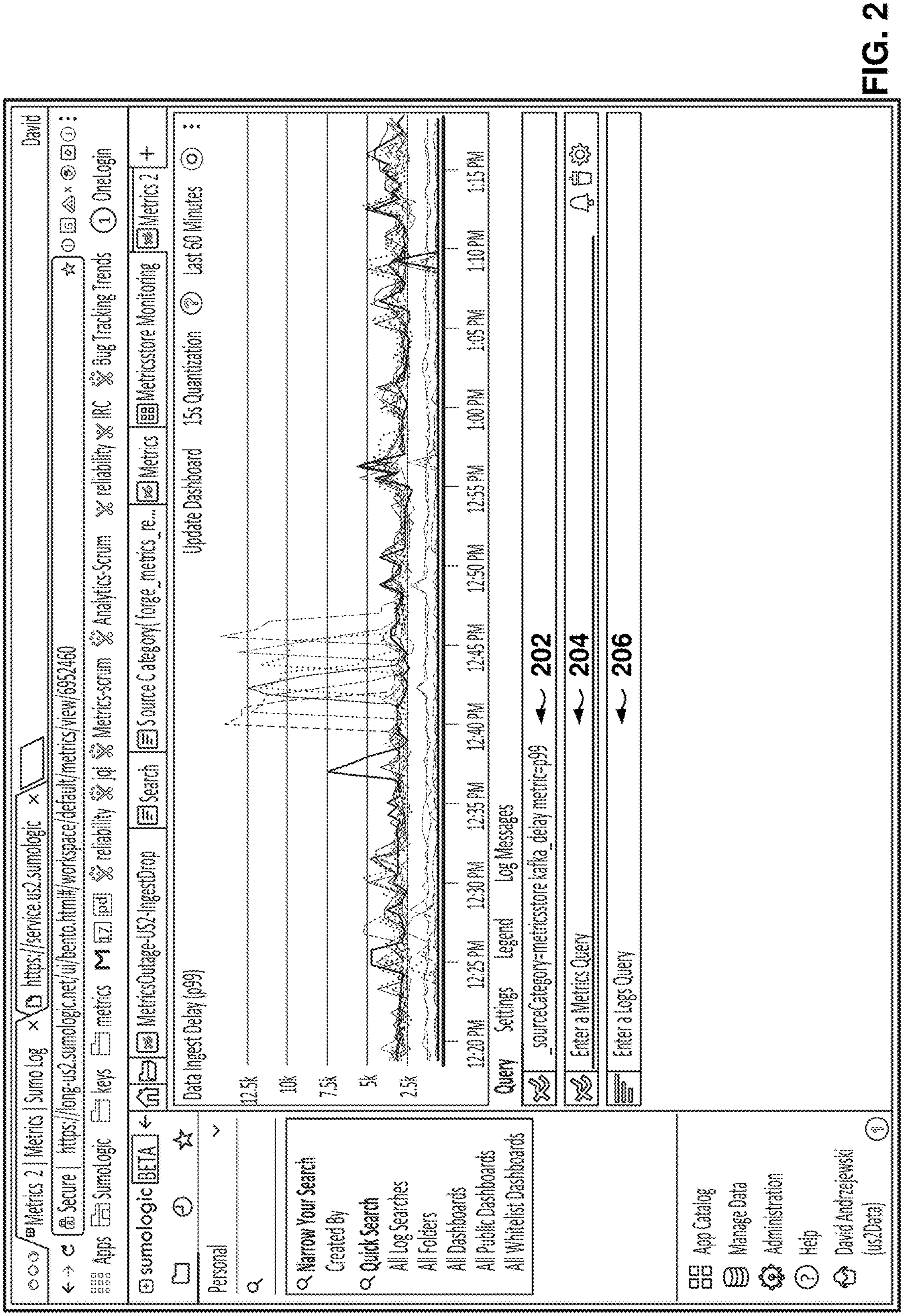
FIG. 2 illustrates an embodiment of an interface for querying time series.

FIG. 2 illustrates an embodiment of an interface for querying time series. In this example, a user utilizes the example dashboard of FIG. 2 to perform a query. As shown in this example, at 202, the user has entered a query 202 for a time series. In this example, the query 202 includes the key values "_sourceCategory=metricsstore" and "kafka_delay metric=p99." Shown also in this dashboard are fields for entering metrics queries 204 and logs queries 206.

Figure 3:
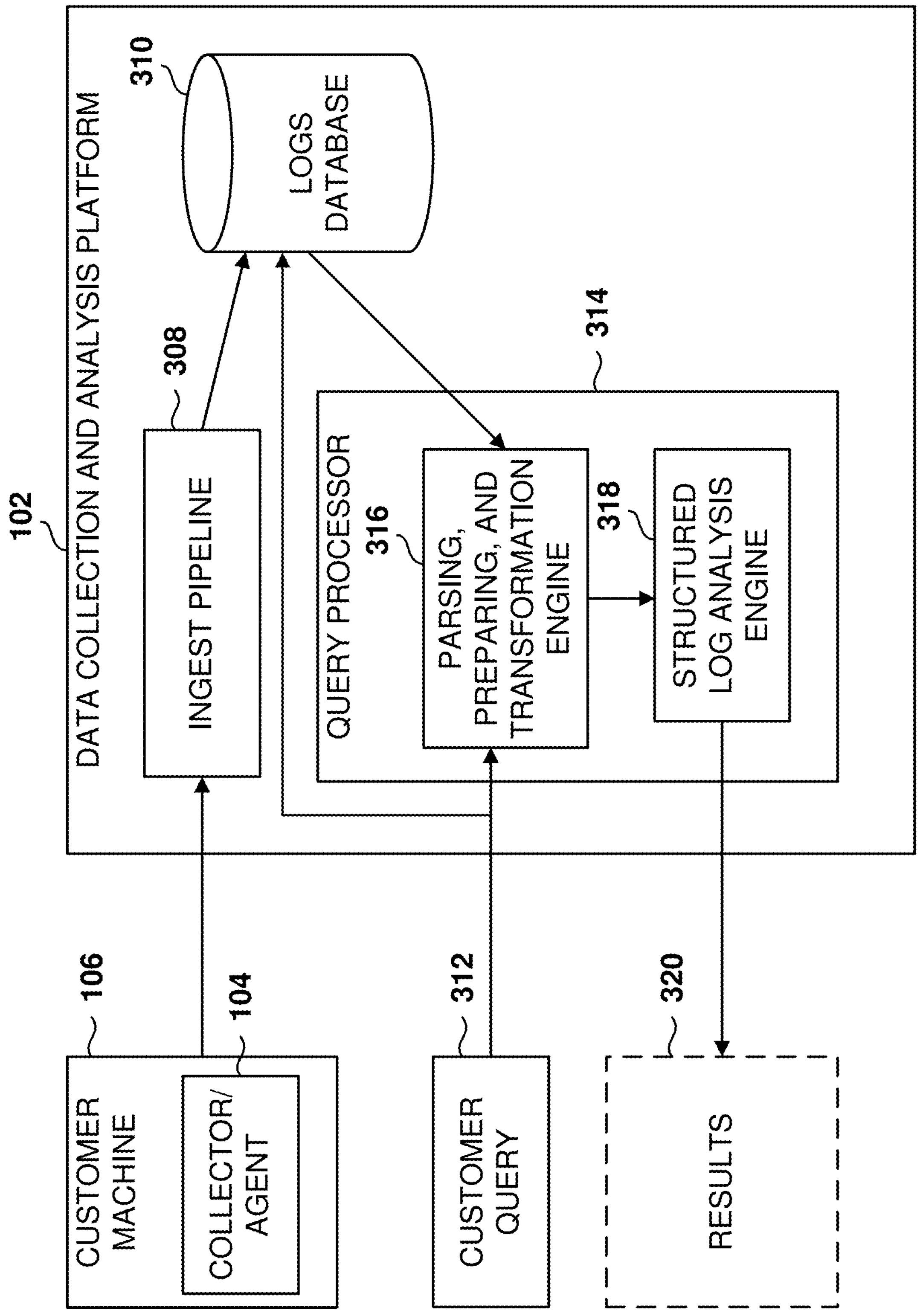
FIG. 3 illustrates an embodiment of an environment in which structured log analysis is performed.

FIG. 3 illustrates an embodiment of an environment in which structured log analysis is performed. The raw machine data is ingested by ingest pipeline 308, which, as one example, is implemented as a service receiver cluster. In one embodiment, the query processor 314 is implemented on the platform via a microservices architecture, where different services may take customer query input and call other services to retrieve and process the log data.

The platform allows the customer to perform queries to explore structured log data and/or to explain observed outliers in the structured log data. In some embodiments, the end user may indicate what type of structured log analysis they would like to perform by selecting (e.g., via user input) certain types of operators to perform on structured log data.

As shown in this example, customer query 312 is processed by parsing, preparing, and transformation engine 316. In one embodiment, engine 316 uses various analytics operators to "massage" or otherwise transform data into a tabular format, as well as highlight fields/features of interest for the user.

In this example, the transformation engine 316 evaluates the incoming query 312 to determine what logs in logs database 310 are of interest. Engine 316 then parses, prepares, and/or transforms the relevant log data (e.g., structured log data in this example) for analysis, according to the query. For example, engine 316 is configured to perform structured parsing on input raw structured log data for input to downstream operators, such as those described herein.

In some embodiments, this phase of structured parsing includes executing an operator to aid in structured log analysis that facilitates reducing structured logs to clusters of schemas of interest to the user. In some embodiments, extracting and clustering on key-schema is performed as part of a LogReduce Keys operator, where additional filtering down to a schema of interest may also be performed by a LogReduce Keys operator by leveraging engine 316 to perform the filtering.

The structured log analysis engine 318 is also configured to generate frequent explanations in a test condition (e.g., failure/outage) versus a normal condition. In some embodiments, this also provides the functionality of further drilling down to see subsets of data fulfilling a generated explanation.

As one example of analyzing structured log data, suppose that a querying system is being monitored. Each time a user runs a query, a log is generated. The log includes rich, structured information about the query that was run. At any given time, some of these queries might fail, take too long, or otherwise go wrong. Having such logs may be critical in determining how a query engine is monitored and troubleshooted. In this example, the logs are captured in a structured way.

An end user may delve into their structured log data by specifying or invoking certain operators in their queries. In some embodiments, the data collection and analysis platform 102 may provide summary analytics over structured data sets through three operators that are interoperable. For example, the following structured log analysis may be performed to address various problems that are experienced in various use cases (such as DevOps use cases and security use cases for User and Entity Behavior Analytics (UEBA)):

(1) Culling noise through the "LogReduce Keys" operator by looking at a set of records and identifying the unique set of combinations across those fields called key schema (i.e., identifying the fixed structure of the fields) mapped to frequency called count (aka frequency of patterns) with, for example, deltas presented at the end of the schemas (e.g., the last 2 rows);

(2) Clustering by finding logs similar to each other through the "LogReduce Values" operator with a frequency analysis so that users can engage in rapid exploratory testing of hypotheses across the landscape (as well as over time) and delve deeper via the quick-links into the underlying subset of data; and (3) Providing an explanation system by identifying outliers through the "LogExplain" operator by getting to an answer quickly through a test condition application of: (a) surfacing the patterns; (b) providing a percentage of relevance determined by how often it appears in the test condition vs. a control group; (c) comparing the percentage that the pattern appears in each of the test condition vs. control via test coverage and control coverage; and (d) exposing the total count that the pattern appears in both the test condition and control (aka sample size).

The LogReduce Keys operator is configured to cluster an input set of ingested structured log data according to a key schema. This includes clustering structured log data by different combinations of keys. For example, different canonical key spaces or schema of the structured JSON data in a set of logs may be determined. In some embodiments, the most common (combination of) keys that are present in the input set of structured log data may be presented. Thus, the data collection and analysis platform 102 is able to provide to a user a way to group search results 320 (of a log search query) according to key schema, such that the user may view/explore structured log messages that are grouped based on the keys.

In some embodiments, the results 320 of clustering an input set of structured log data by key schema is presented to a user via a user interface. The structured log analysis platform may present a summarized view of the different key schemas identified in the structured log data, where each key schema is associated with a corresponding cluster of logs that have that key schema. In this way, a user may see what are the different schema that are represented.

Suppose, for example, that now that an end user is able to see the different types of key schemas in the input set of log data, the end user is now interested in certain fields of interest. For example, a user may wish to further explore a key schema cluster that has a small number of logs. The user can view a subset of their data that is homogeneous with respect to a certain schema (all the logs in a cluster have the same JSON schema). The user may have become interested in that particular schema due to the low count or number of raw logs in that cluster that is presented via the UI. Now the user would like to view the associated values for that subset of logs in that cluster. In some embodiments, the user can use the LogReduce Values operator to cluster those logs based on how similar they are with respect to the values (and not necessarily the keys that were in those positions in the key schema). In this way, when a user creates a query for certain logs in a batch of structured logs that have been ingested, the data collection and analysis platform 102 may provide the user a way to group the search results (e.g., JSON messages) based on key-values.

Output may be provided by the data collection and analysis platform 102 based on the results of the clustering of structured log data by key-values as described above. For example, the data collection and analysis platform 102 may display to a user, via a user interface, log messages grouped based on key-values. The number of messages in the group and the signature for the cluster may also be presented as output.

In addition to the security domain, the structured log analytics techniques described herein may also be applicable to the ops (operational) domain. For example, the structured log analytics platform may determine if a node or a container or a Kubernetes pod is behaving strangely based on its signatures and values that it is emitting. This provides a mechanism by which to detect anomalous behaviors that may be used to prevent events such as outages.

LogExplain Operator

The LogExplain Operator provides information on reasons why a value for a set of fields is observed and whether that reason has to do with certain exploratory keys. For example, once the user has a broad understanding of their logs (e.g., using the LogReduce Keys and/or LogReduce Values operators described above), they may like to dissect them further to understand causation for a security incident or outage.

In some embodiments, the LogExplain Operator is an operation that automatically finds explanations and visualizations that describe patterns on structured log data (e.g., JSON data). For instance, one use case of the LogExplain operator is to find explanations that can explain why one group of logs (also referred to herein as the test set) is different than its complement set (also referred to herein as the control set). In some embodiments, the test set contains logs that indicate abnormal or outlier system behaviors, while the control set contains logs that inform the user of expected or baseline (inlier) behavior. In some embodiments, an explanation is defined as a set of key-value pairs common to the test set, but rare for the control set.

Figure 4:
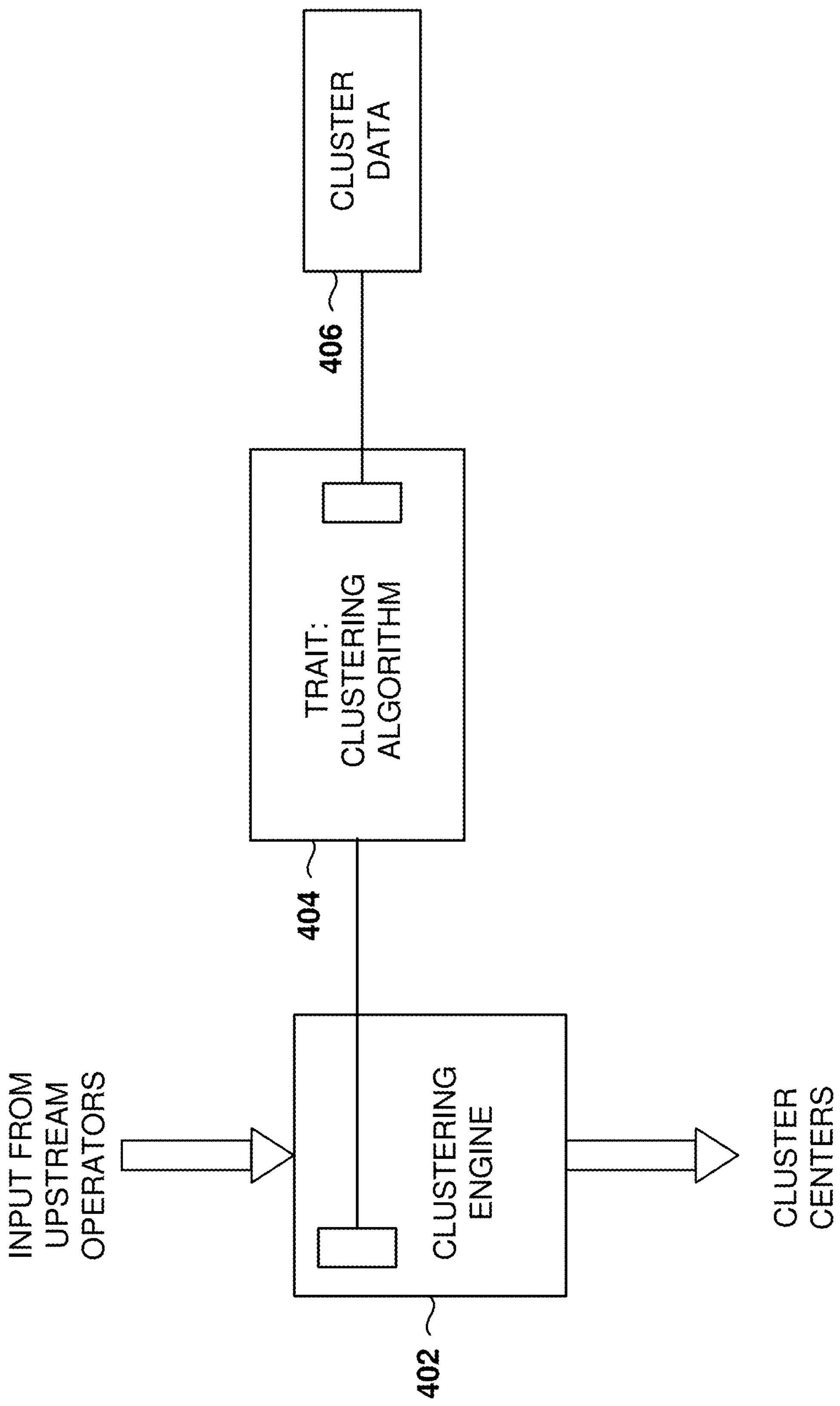
FIG. 4 illustrates an embodiment of an operator pipeline for implementing a LogReduce Values operator.

FIG. 4 illustrates an embodiment of an operator pipeline for implementing the LogReduce Values operator. Clustering engine 402 is configured to cluster input structured data. The clustering engine is configured to take the input from upstream operators and generate cluster centers. In some embodiments, the clustering engine uses a trait clustering algorithm 404, which is configured to cluster categorical data streams.

In some embodiments, the trait clustering algorithm defines the requirements that any categorical stream clustering algorithm/models should satisfy. In some embodiments, the requirements include protocols to initialize the state of the clustering algorithm and update underlying data structures (i.e., the cluster centers), as data is being fed as a result of the algorithm, and also perform bookkeeping of the resulting data structure (e.g., estimating true data cardinality, estimating data structure memory, etc.). In some embodiments, the trait clustering algorithm 404 stores cluster data 406. In some embodiments, the clustering data structure keeps track of the frequency of key-value pairs seen in the logs for each cluster. This facilitates more efficient lookup of which keys and values are commonly associated with a cluster. In one embodiment, the clustering data structure is implemented as a two-level hash map of keys->values and values->counts. The clustering data structure may also prune key-value pairs that occur rarely in a cluster and are thus not associated with the cluster.

Figure 5:
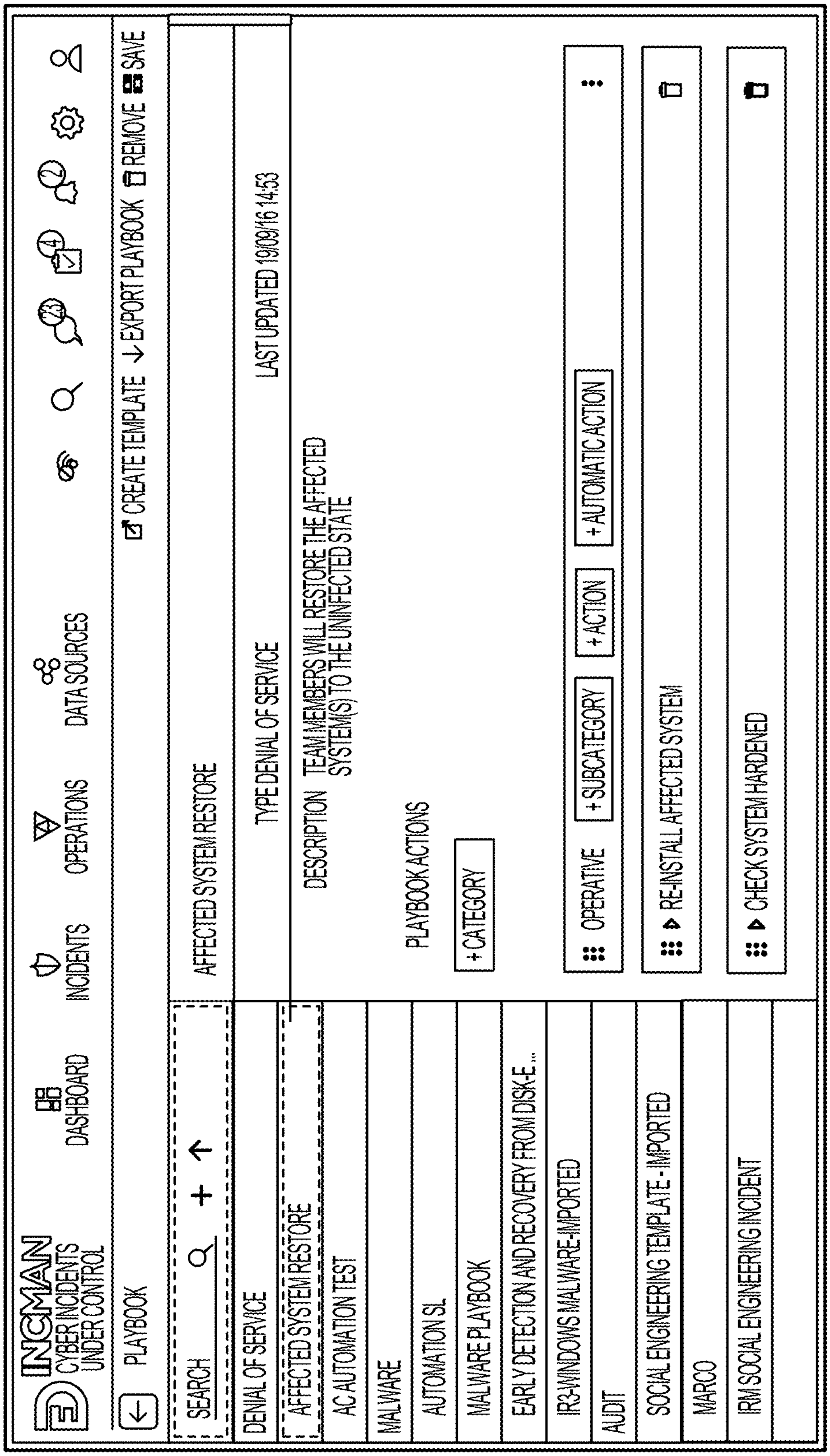
FIG. 5 is a screen display presenting playbook information, according to some example embodiments.

FIG. 5 is a screen display presenting playbook information, according to some example embodiments. A playbook is a collection of manual and automated actions designed to resolve an incident or complete an investigation. The playbook generation system accesses of the data collection and analysis platform for building a model for generating playbooks. In some example embodiments, a playbook generation system follows a machine learning approach that includes model construction, model query, and model update. In the first stage a model is constructed based on the historical data. In the query stage, the model is queried for an output (i.e., a recommended playbook). In the update stage, the model is updated with new information.

In the illustrated example, the playbook generation system has recommended a custom playbook for a denial-of-service incident that includes prescriptive procedures for restoring the affected system to its uninfected state. The user may choose to use the custom playbook, or use a different playbook, or remove an action to the custom playbook, or add an action to the custom playbook. The playbook generation system records the user actions to update future custom playbook recommendations.

Figure 6:
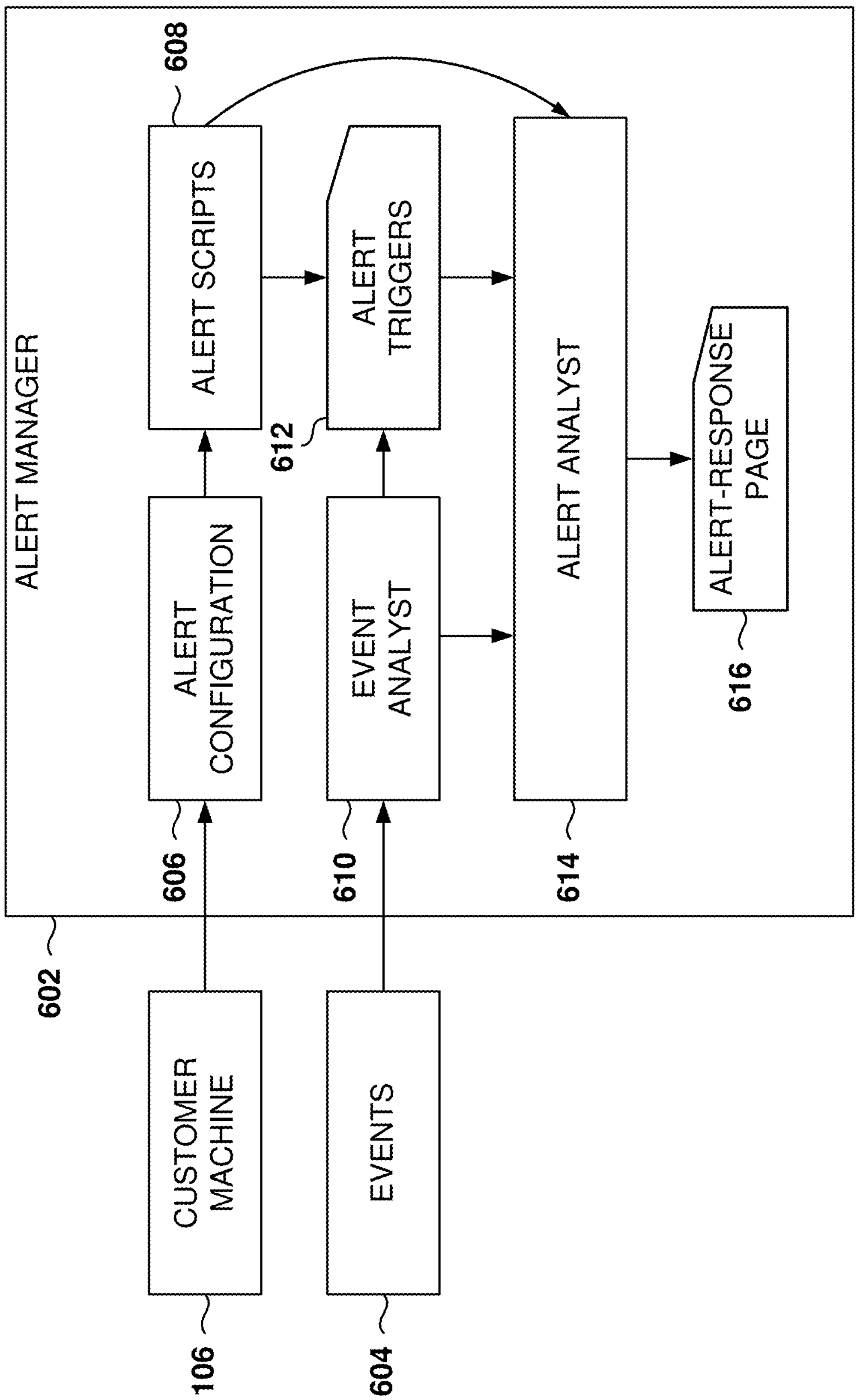
FIG. 6 is a sample high-level architecture for alert management, according to some example embodiments.

FIG. 6 is a sample high-level architecture for alert management, according to some example embodiments. The alert manager 602 comprises an alert configuration module 606, alert scripts 608, an event analyst 610, and alert analyst 614.

The alert configuration module 606 interacts with the user via input from a customer machine 106 to configure alerts. In some example embodiments, one alert script 608 is created for each alert. The alert scripts are performed on incoming data, such as logs received by the data collection and analysis platform 102 of FIG. 1.

The event analyst analyzes incoming events 604, such as incoming logs or metrics, using the alert scripts 608 to determine the alert triggers 612 that activate an alert. The alert is processed by the alert analyst 614 to generate the alert-response page 616, which includes information about the alert to assist the operator in troubleshooting the alert. The information in the alert-response page is more than simply a list of logs associated with the alert, because the alert analyst 614 analyzes the known information in the system to assist in the troubleshooting. For example, the alert analysis may include comparing the behavior over a system during a period where the system was operating successfully, and comparing this behavior with the behavior of the system around the time of the alert.

A typical process for resolving the alert includes three phases: monitor, diagnose, and troubleshoot. In the monitor phase, the operator wants to determine whether the alert is real or a false positive. The operator would try to gather more information about the alert, such as:

Has this alert fired in the past? If yes, how often?

How bad is the latency that customers are experiencing?

Is a specific set of customers experiencing it or are all customers experiencing the same issue?

In the diagnose phase, after establishing that the alert needs attention, the goal is to understand what else is happening in the application or infrastructure that might help explain the issue. Typically, the operator may look at dashboards for the application, service, and app component layers (RDS, Nginx, MySQL etc.), to find unusual behavior (CPU high on certain service, or high error count on another service), and try to correlate the unusual behavior with the issue at hand. The task by the on-call engineer to visually correlate information places an undue burden at a stressful, high-stakes time. If that was not enough, there are a few other challenges.

During the troubleshoot phase, the investigation starts after having identified one or more suspects in the diagnose phase. This is done typically by gathering supporting information. This requires two main skills correlating the observed suspects back to the main alert, and finding evidence to prove or disprove the hypothesis.

Further, the observed suspects are correlated back to the main alert. "Is the connection timeout on service X related to the high latency that customers are experiencing?" If yes, how? This requires tribal knowledge, system understanding, and the ability to connect the dots. Now, this is a tall order and an expert engineer is required to do it effectively.

The engineer needs to find evidence that either proves or disproves your hypothesis. For example, if the connection timeout on service X is related to the high latency that customers are experiencing, then what data in logs, metrics, or traces can be found to corroborate the hypothesis? This means that the engineers needs to know how to run ad-hoc queries in the available tools to get at the "data behind the dashboards" in order to find the evidence required.

The alert-response tool applies advanced analytics across a unified repository of telemetry data to ease the burden faced by on-call teams in troubleshooting issues, improving the troubleshooting experience for on-call engineers. The alert-response tool eases the burden on the user to troubleshoot problems by proactively, automatically analyzing the problem without having to receive a user request.

In some embodiments, the alert script 608 is configured via the setup of a monitor, and when the monitor is triggered, the monitor generates the help with notification payload for opening the alert-response page. Here's an example of an example message payload:

```
{
  "attachments": [
    {
      "pretext": "Custom Alert",
      "fields": [
        {
          "title": "Alert Page",
          "value": "{{alertResponse Url}}"
        }
      ],
      "mrkdwn_in": ["text", "pretext"],
      "color": "#29A1E6"
    }
  ]
}
```

Further, here is an example query script for checking the latency of a process for making a cup of coffee:

```
cluster=sedemo=prod namespace-warp004*
| parse "Coffed preparation request time: * ms" as latenty
  nodrop
| if (isBlank (latency), "false, "true) as hasLatency
| if (isBlank (latency), 0.0, latency) as latency
```

| latency/1000 as latency
| pct (latency, 95) by hasLatency
| where hasLatency="true"

The trigger condition may be defined as follows:

_latency_pct_95 is greater than 1.0 in the last 5 minutes

One of the most common alert-generating problems is high latency for a certain system process, meaning that it is taking too long for the process to complete, and high latency is basically slow response.

In one example, there is a front end and a back end for processing website operations. The front end handles user requests, and the back end includes services, also referred to sometimes as microservices, that perform different tasks, such as adding an item to a shopping cart, executing a pod, processing a credit-card payment, etc. In this particular alert for coffee preparation, the message is that that the preparation time for coffee has increased beyond a certain threshold.

Figure 7:
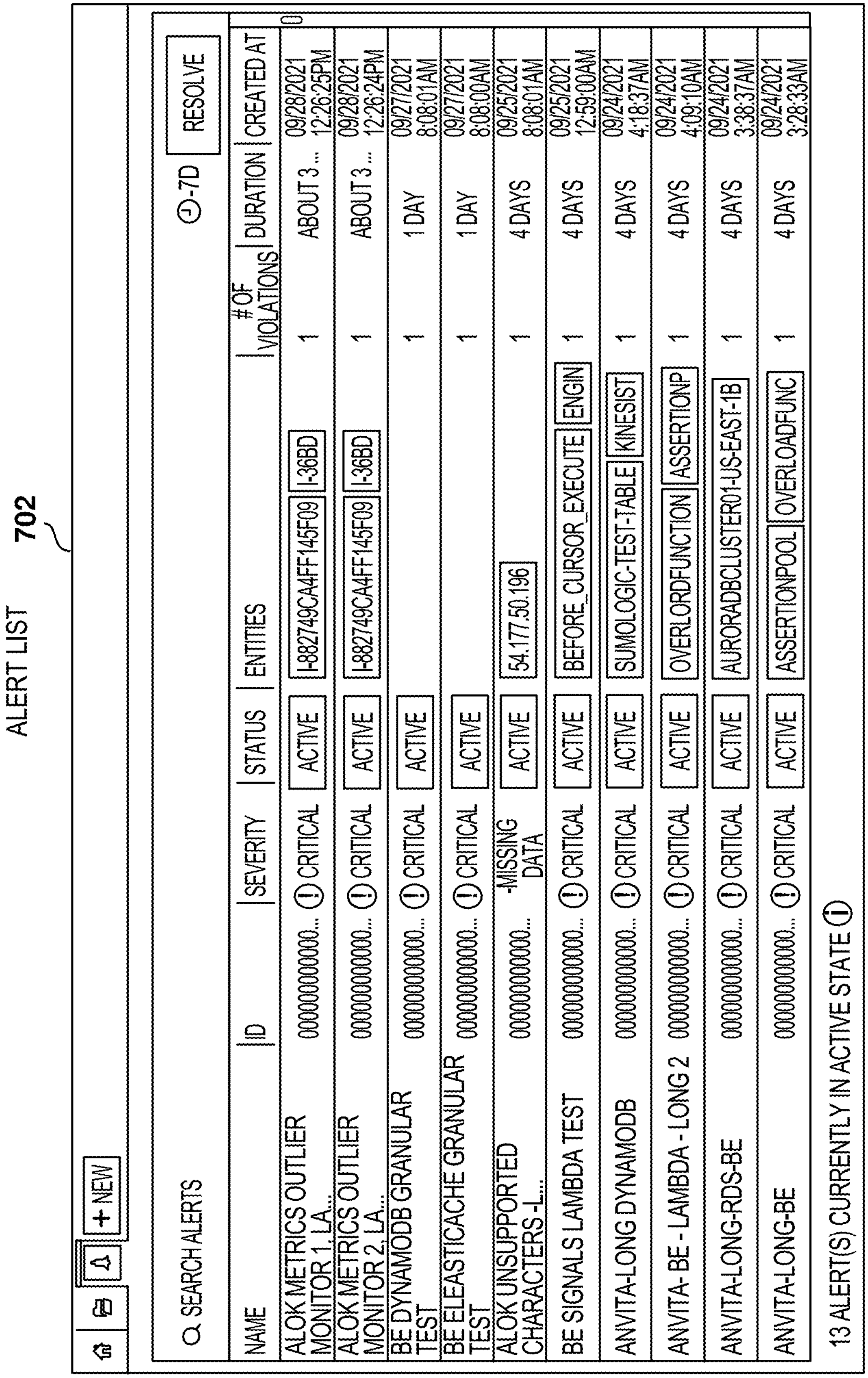
FIG. 7 is a user interface showing an alert list, according to some example embodiments.

FIG. 7 is a user interface 702 showing an alert list, according to some example embodiments. The alert list shows the alerts from triggered monitors within a predetermined time period (e.g., the past seven days). By default, the list is sorted by status (active on top), and then chronologically by creation time.

The alert list is shown in a table with information about alerts. In some example embodiments, the table includes an entry for each alert with information regarding the name of the alert, an identifier (ID) of the alert, a severity of the alert, the status of the alert, one or more entities associated with the alert, number of violations, duration of the problem associated with the alert, and time of creation. If the user selects one of the alerts, the alert-response page 616 of FIG. 6 is presented with information about the alert.

Figure 8:
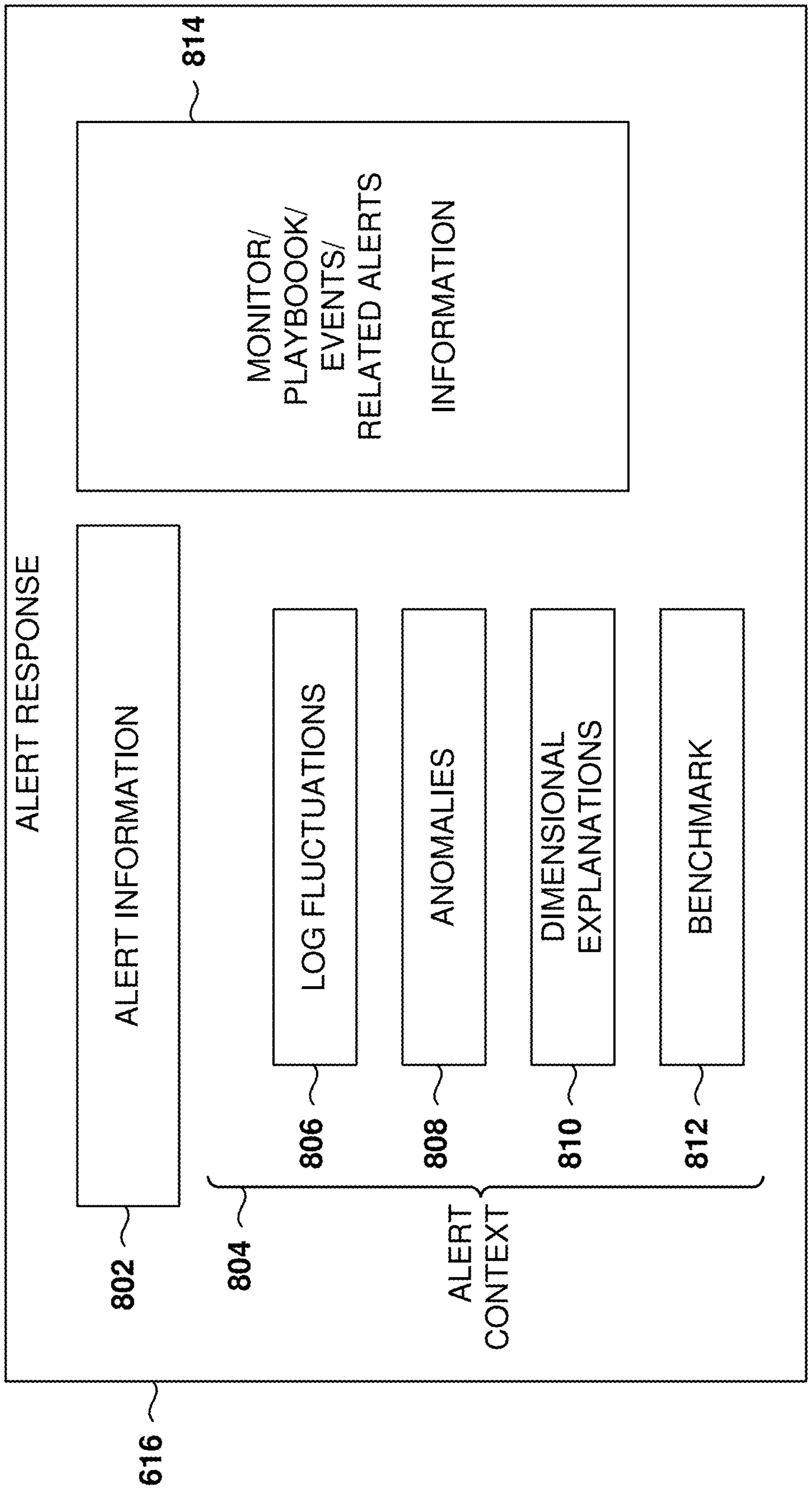
FIG. 8 shows the structure of the alert-response page, according to some example embodiments.

FIG. 8 shows the structure of the alert-response page, according to some example embodiments. The alert-response page 616 provides curated information to troubleshoot issues faster and provides two different types of information: alert information 802 and alert context 804. The alert information 802 provides an overview of the alert that was triggered to help explain the issue and its potential impact. The alert context 804 includes system-curated information to help understand potential underlying symptoms within the system that might be causing the issue.

In some example embodiments, the alert details include at least one of a chart to visualize the alerting Key Performance Indicator (KPI) before and during the alert, a table with the raw data that triggered the alert, related alerts firing in the system around the same time, the history of the given alert being fired in the past, and basic details about the alert, such as when the alert was issued and what triggered the alert.

The alert-response page 616 includes alert information 802, alert context 804, and the related information 814. The related information may include information on the monitor for the alert, a playbook, events, related alerts, etc.

The alert context 804 presents insights that the response-page tool has found by automatically analyzing the data received by the platform to find anomalies or deviations from normal. The system uses artificial intelligence and machine learning to track logs and metrics data to find interesting patterns in the data that might help explain the underlying issue and surface the patterns in the form of context cards, also referred to herein as panels.

Depending on the type of data the alert was based on (e.g., metrics or logs) and the detection method (e.g., static or outlier), different alert-context cards may be presented. In some example embodiments, the alert context 804 includes at least one of the following panels: log fluctuations 806, anomalies 808, dimensional explanations 810, and benchmark 812. Other embodiments may include additional panels. More details are provided below regarding the content of the parts of the alert-response page 616.

Figure 9:
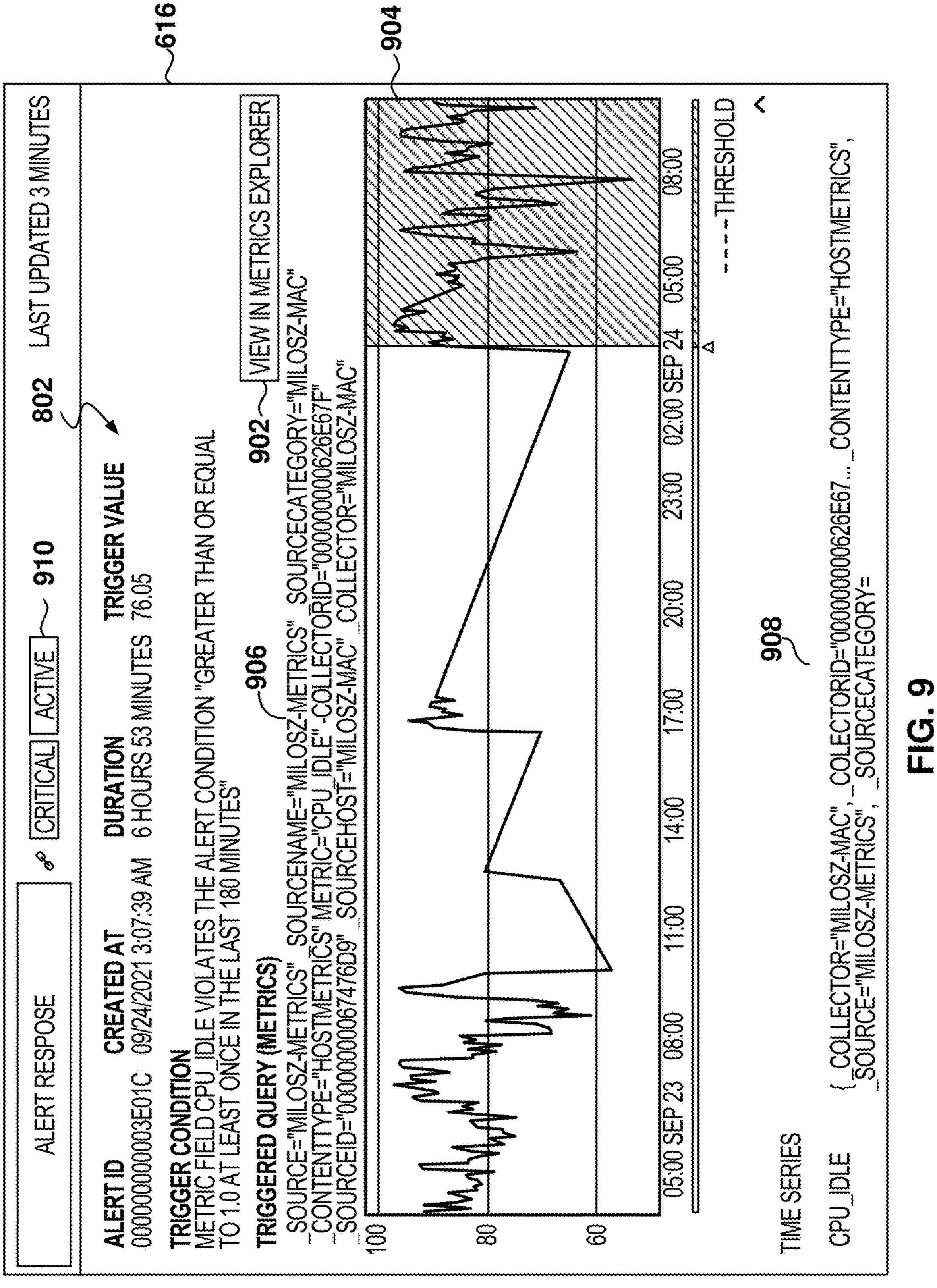
FIG. 9 is a sample user interface for the alert-response page, according to some example embodiments.

FIG. 9 is a sample user interface for the alert-response page 616 of FIG. 6, according to some example embodiments. The top of the alert-response page 616 includes the alert information 802, which includes the type of monitor trigger condition 910 that triggered the alert (Critical, Warning, or Missing-Data), alert ID, time of creation, duration, trigger value, trigger condition (e.g., Metric field CPU_idle violates the alert condition "greater than or equal to 1.0 at least once in the last 180 minutes"), and the query 906 associated with the monitor that triggered the alert.

Further, an option 902 is provided for viewing details of the triggered query in the Metrics Explorer. A chart 904 visualizes the trend of the metric that was tracked as part of the alert condition of the monitor. The visualization tracks the metric trends before the alert and up until the time the alert was triggered. In some example embodiments, the visualization may also include the trends during some period after the alert was triggered.

In this example, the area on the right corresponds to the alert condition where a threshold was exceeded for a configured amount of time. The chart 904 shows that errors increased substantially after this alert was generated, while these errors were almost non-existent before. This provides context around the magnitude and severity of the issue. Further, a table 908 shows the raw data that triggered the alert comprising at least one time series.

In this example, an outage scenario is presented for an online store that sells collectible items. There is something wrong with the website, and as a result, customers are experiencing errors when trying to shop.

There could be hundreds of reasons for the problem and the operator is trying to figure out the actual cause. With these hundreds of potential reasons, typically, the operator must go through thousands of logs to get information on the alert. For example, the operator may have to do some metrics searches, consult multiple logs and dashboards, and so on and so forth. The goal of providing the alert-response page is to help solve the problem much faster (e.g., in a few minutes instead of hours).

Figure 10:
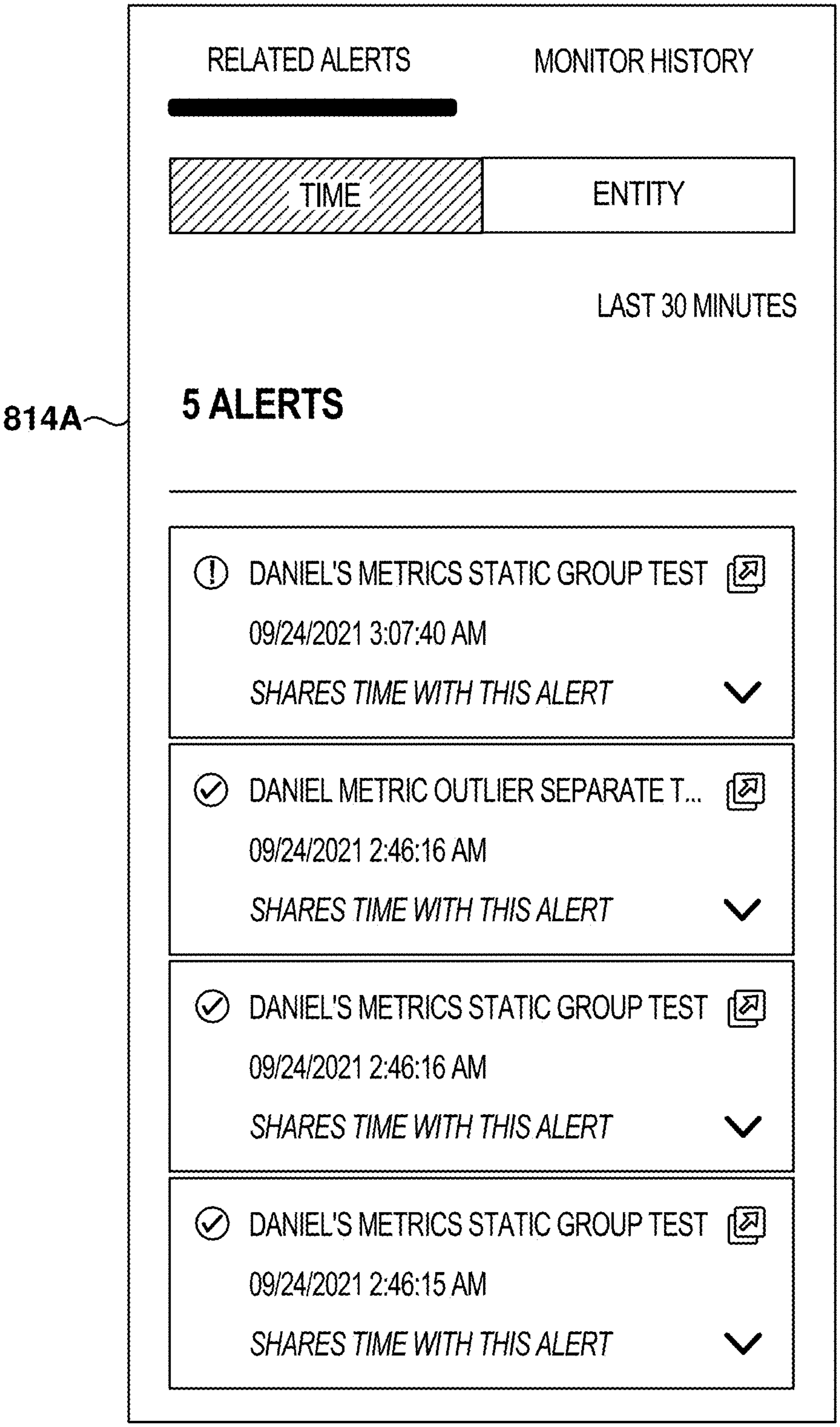
FIG. 10 is a user interface showing related alerts, according to some example embodiments.

FIG. 10 is a user interface 814A showing related alerts, according to some example embodiments. The user interface 814A is a panel shown on the right of the alert-response page 616 of FIG. 8 and provides related alerts and monitor history, which may be shown according to time or according to entity. The user interface 814A shows the list of alerts with their timestamp, where the explanation mark icon on the top left of the alert indicates that the alert is still active.

The time option shows the alerts that were triggered 30 minutes before or after the given alert. The entity option is described below with reference to FIG. 17. Further, an option is provided to view the alert's trigger condition by clicking on the down arrow in a V shape, and another option is provided to open the alert in its own alert-response page by selecting the up-arrow inside the square. The related alerts may provide valuable information, such as pods crashing in the system, which may be caused by the underlying issue.

Figure 11:
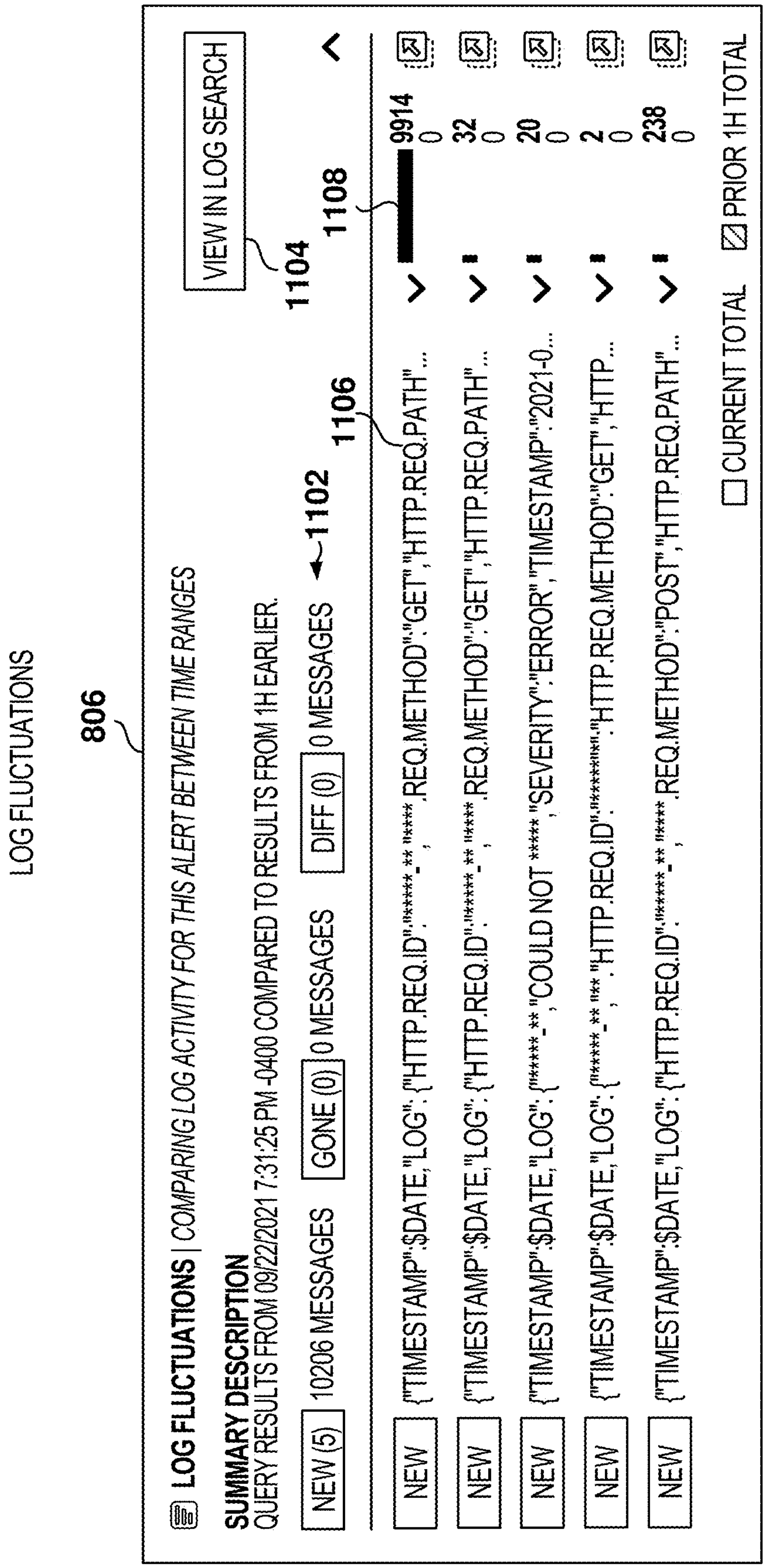
FIG. 11 is a sample of a user interface for log fluctuations 806, according to some example embodiments.

FIG. 11 is a sample of a user interface for the log fluctuations 806 of FIG. 8, according to some example embodiments. The log fluctuations 806 card leverages the LogReduce tool to identify changes in log patterns or signatures (for example error, timeouts, etc.) that might help explain the underlying issue.

The log fluctuations 806 panel shows the detection of different signatures in the associated log messages, such as by using LogReduce for errors, exceptions, timeouts, and successes. The system compares log signatures trends from a normal baseline period (e.g., one hour before the alert) to the alert period and surfaces noteworthy changes in the signatures.

The top line of the log fluctuations 806 panel includes a short description of what the card does (e.g., "Comparing log activity for this alert between time ranges") and a summary description (e.g., query results from a given time compared to one hour earlier).

In some example embodiments, there are three types of cards 1102: new, gone, and diff. The new card is for log signatures that were only seen after the alert was triggered but not prior (e.g., one hour before) to the alert start time. The gone card is for log signatures that are not present after the alert was created but were present prior (e.g., one hour before) to the alert start time, such as "Transaction Succeeded" or "Success." The diff card is for log signatures whose counts have changed after the alert when compared to the period before the alert start time.

In the illustrated example, five new cards were found, and details are provided in table 1106 below. Each row shows information about the new card, such as timestamp, URL, log signature, etc., and a count 1108 of the logs associated with the new signature (e.g., 9914) and the count before (e.g., zero in this example).

Each row of table 1106 includes details for one of the cards 1102, such as the details for the identified signature. Further, an option 1104 is provided to view the details of the logs in the log-search tool.

In the illustrated example, the log fluctuations 806 has identified a connection failure error signature. These failures started happening after the alert (252800 log messages match the signature compared to 0 before the alert).

Thus, the log fluctuations 806 panel provides the information that the operator would have to search by analyzing multiple log clusters, such as by using the LogReduce tool. This saves a lot of troubleshooting time since the operator must focus on just a few signatures that show discrepancies during the normal period and the alert period. Further, the results are presented in easily understood buckets.

The identified cards are ranked according to their relevance based on statistical analysis of the counts, but other ranking methods may be used. Further, an option is provided to the right of each card to view the logs that correspond to the signature of the card.

Figure 12A:
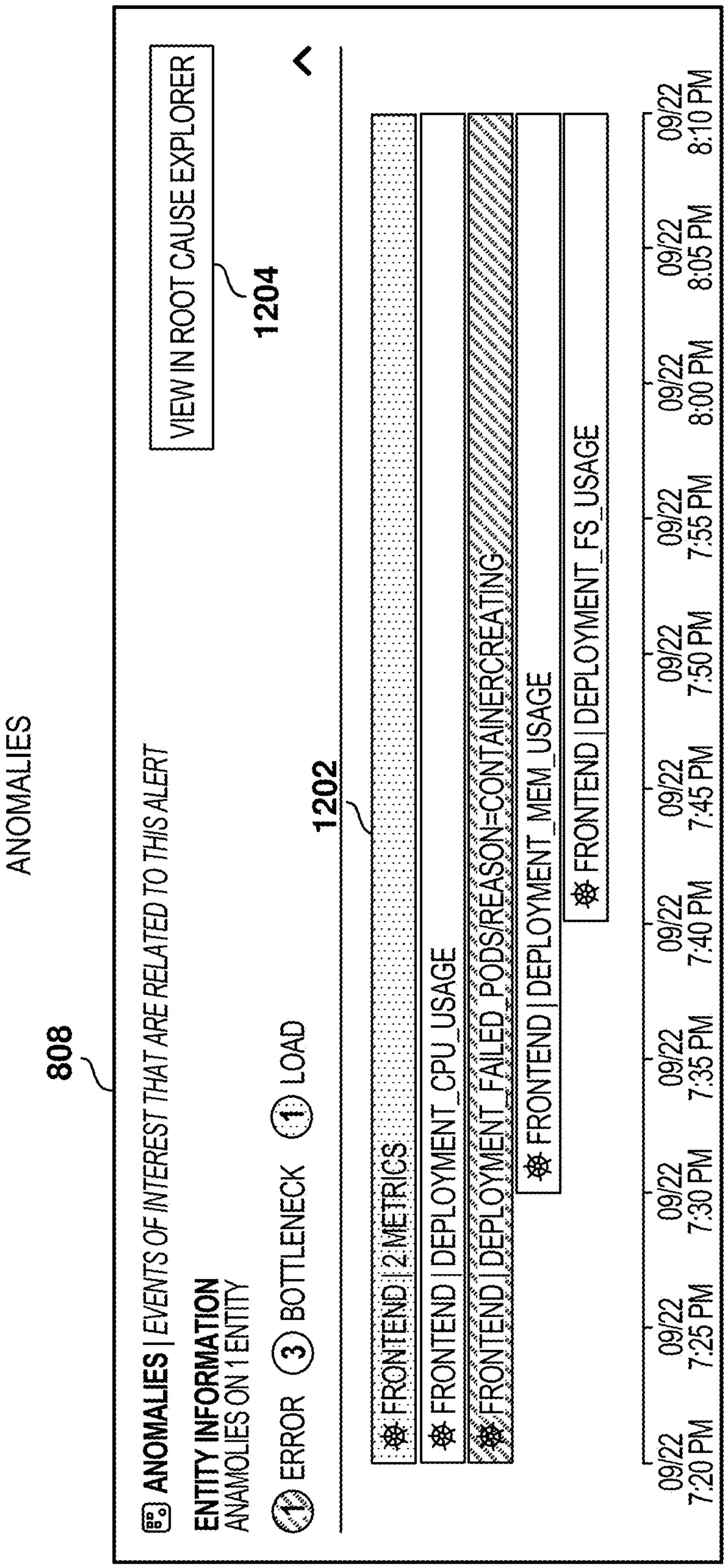
FIGS. 12A-12B show a user interface for presenting anomalies, according to some example embodiments.
Figure 12B:
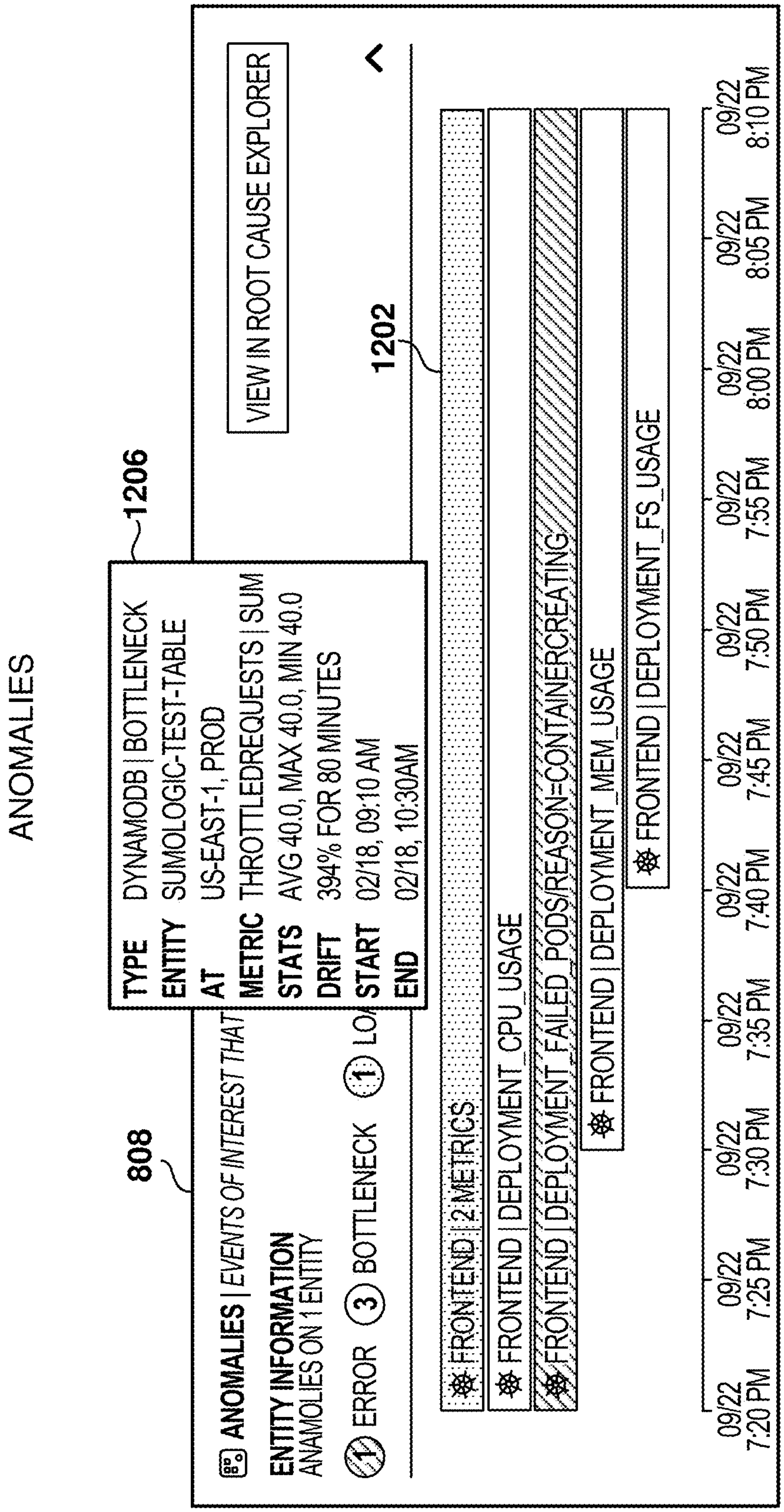

FIGS. 12A-12B show a user interface for presenting anomalies 808 related to the alert, according to some example embodiments. The insights are powered by a tool called Root Cause Explorer.

Each alert is associated with one or more entities based on the definition of the script that triggers the alert. For example, each of the items in the query may correspond to an entity. The entity can be of many kinds, such as an application, a service, an infrastructure element, a microservice, etc. In this case, the service is running on a cluster with pods and containers. The discovered entities include sumologic-test-table, deployment_cpu_usage, deployment_failed_pods, deployment_mem_usage, etc. The discovered entities are then used to analyze the data for each entity and find out if there is any correlation to the alert.

The top of the anomalies 808 card includes a description of the information presented, e.g., "Events of interest that are related to this alert." Following is a summary for Entity Information, e.g., "5 anomalies on 1 entity." Also, a count of the anomalies for each type (e.g., Error, Bottleneck, Load) is presented.

The anomalies are presented in a chart 1202, one row for each anomaly, where the horizontal axis is time, and the row width corresponds to the duration of the anomaly (from start to end time). Each row presents information on the domain (e.g., AWS, Kubernetes), and the entity on which the anomaly was detected. Anomalies may be grouped based on connections between entities and similarity of metrics. For example, anomalies on EC2 instances that are members of an AutoScaling group may be grouped together. The count shown in each anomaly refers to the number of grouped anomalies. Further, an option 1204 is provided for viewing the anomalies in the Root Cause Explorer tool.

FIG. 12B shows information box 1206 presented when the mouse pointer is hovered over one of the anomalies, and the box 1206 shows information about the anomaly, such as anomaly type (e.g., DynamoDB|bottleneck), the name of the entity (e.g., sumologic-test-table, location (us-east-1, prod), metric (e.g., ThrottleRequests|Sum), statistics (e.g., average 40.0, maximum 40.0, minimum 40.0), drift (e.g., 394% for 80 minutes), start time, and end time.

Figure 13:
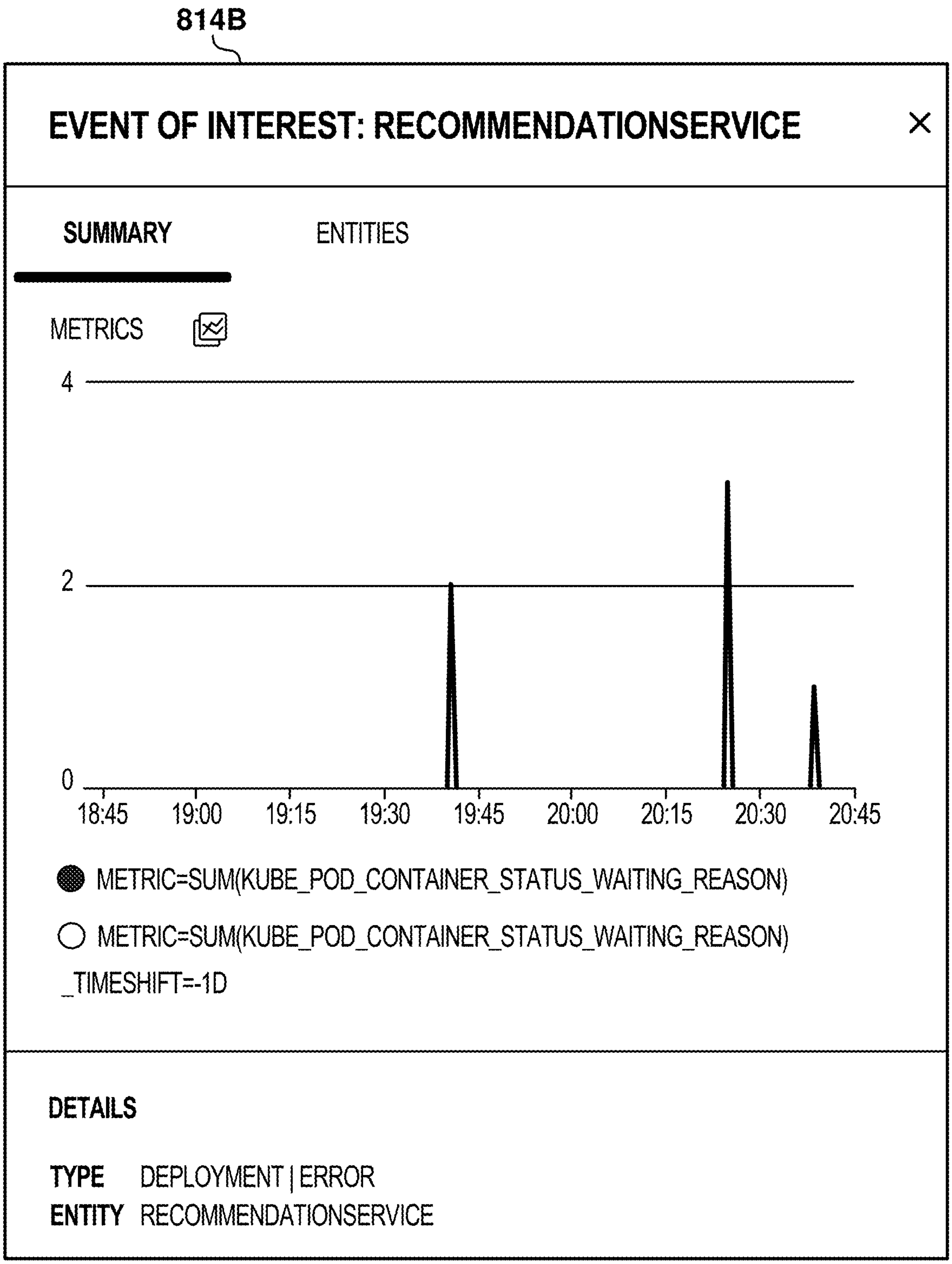
FIG. 13 is a user interface for presenting events of interest associated with the alert, according to some example embodiments.
Figure 14:
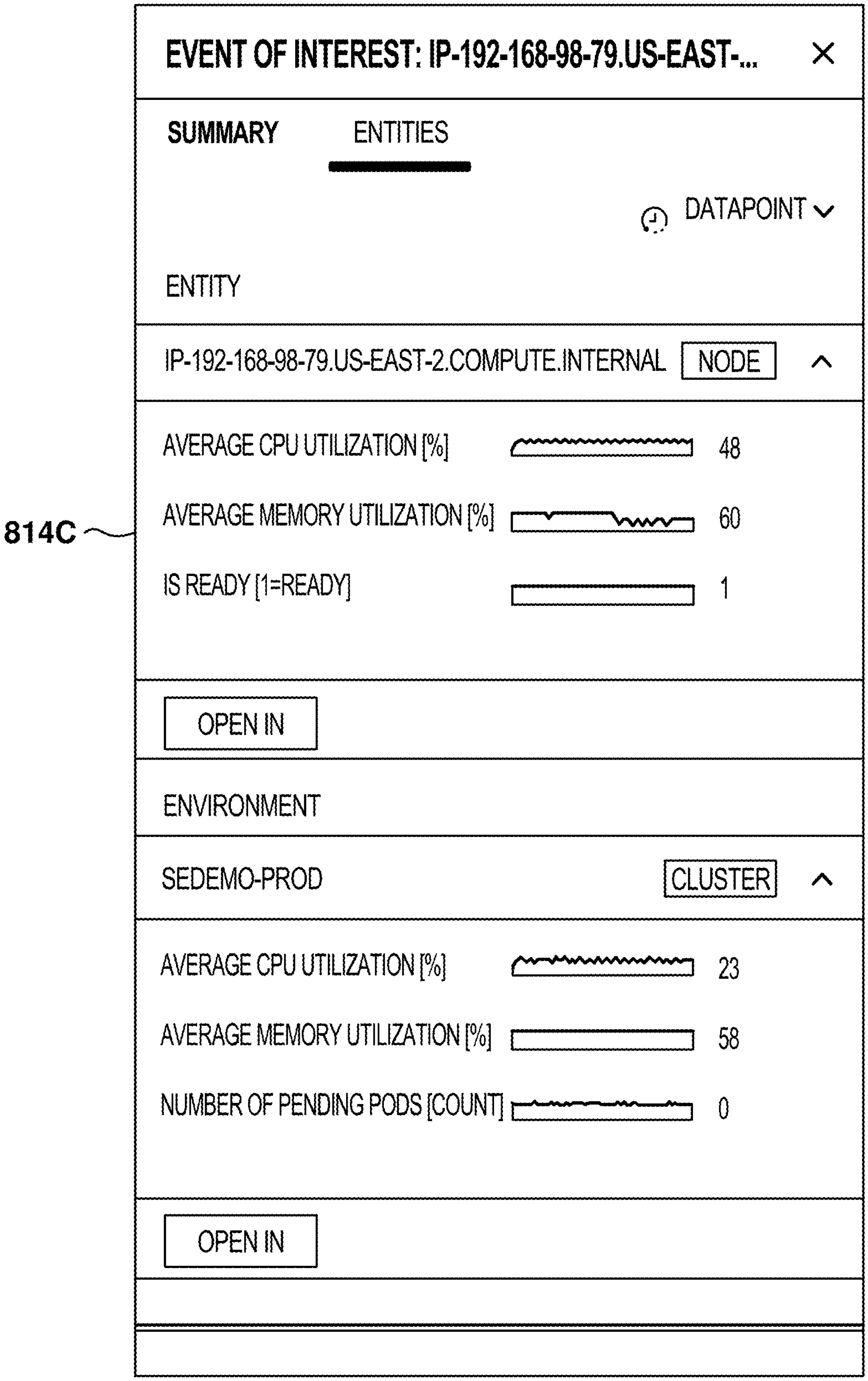
FIG. 14 is a user interface for presenting entities related to the alert, according to some example embodiments.

In some example embodiments, if the user clicks on the anomaly, a summary viewer and entity-inspector tool are presented as shown in FIGS. 13 and 14.

FIG. 13 is a user interface 814B for presenting events of interest associated with the alert, according to some example embodiments. Two tabs are selectable: summary and entities. The summary tab (in the illustrated example) shows the metrics of interest in a time chart.

In the illustrated example, there are three spikes for a metric associated with a pod container. Additionally, details are provided regarding the type of anomaly and the entity.

FIG. 14 is a user interface 814C for presenting entities related to the alert, according to some example embodiments. A list of entities is presented, which in the illustrated example include a node and a cluster. For each entity additional information is provided, such as the illustrated statistics regarding average CPU utilization, average memory utilization, and readiness (1 or 0) are presented.

In some cases, there is a hierarchy for clusters that contain machines, also referred as nodes. A cluster can contain multiple deployments and has references to a namespace. All these entities are analyzed to determine the related entities and see if each entity is associated with an anomaly.

Figure 15:
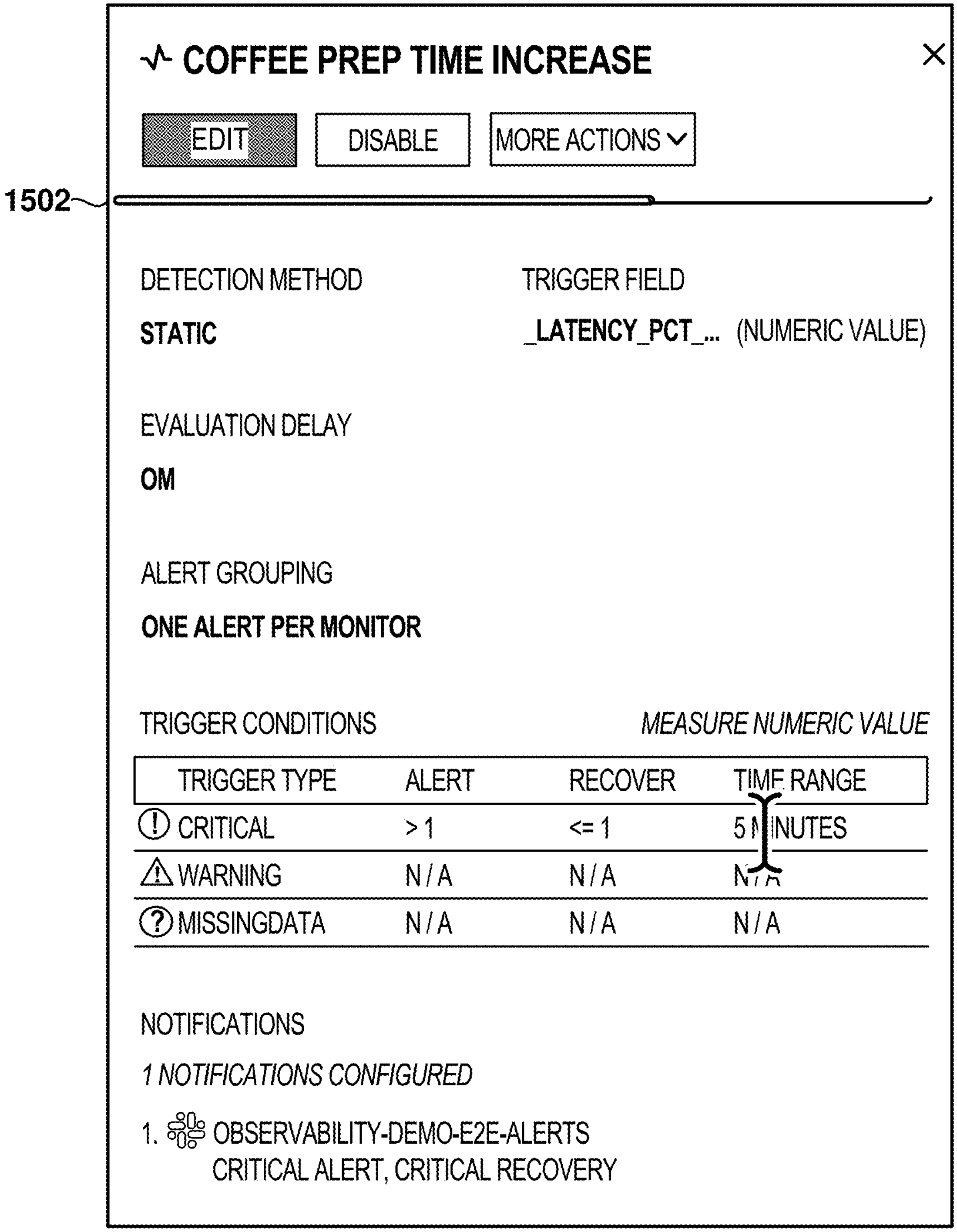
FIG. 15 is a sample user interface for configuring an alert, according to some example embodiments.

FIG. 15 is a user interface 1502 for configuring an alert, according to some example embodiments. The user interface 1502 includes tabs for editing (as shown), disable the alert, and other actions (e.g., delete, troubleshoot).

The user interface 1502 includes details about the alert, such as detection method, trigger parameter (e.g., _latency_pct), evaluation delay, alert grouping (e.g., one alert per monitor), trigger conditions, and notifications.

There may be multiple types of triggers. In the illustrated example, three different triggers are configured: critical, warning, and missing data. For each trigger, there's a threshold value for the alert (e.g., ">1"), a recover threshold value (e.g., <=1), and a time range (e.g., five minutes) which determines how long the alert situation must persist before the alert is triggered, which helps avoid false positives.

In this example, the critical alert is triggered when the latency is greater than one for at least a period of five minutes, and the condition is considered recovered when the latency is below or equal to one.

Figure 16:
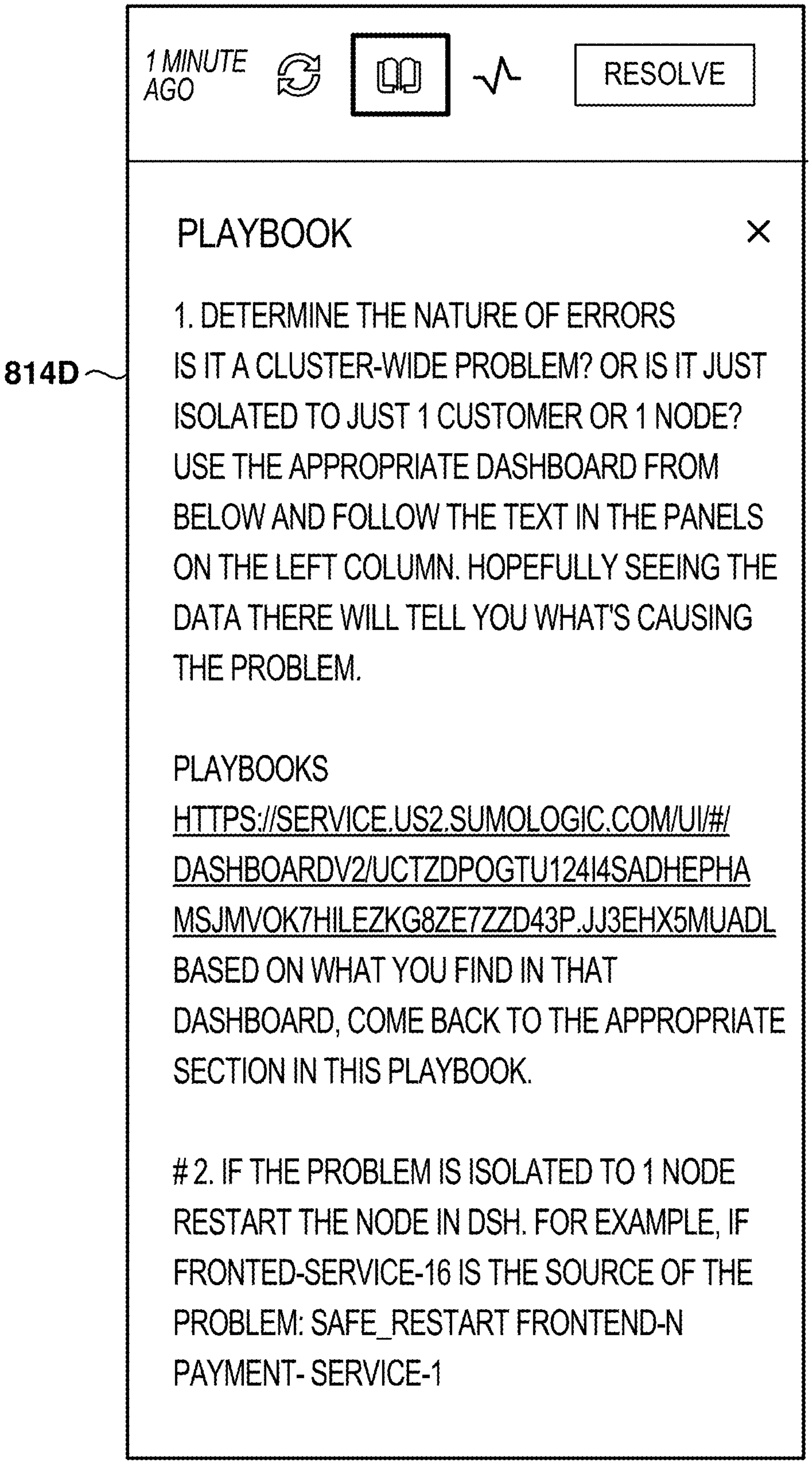
FIG. 16 is a sample user interface for presenting playbooks related to the alert, according to some example embodiments.

FIG. 16 is a user interface 814D for presenting playbooks related to the alert, according to some example embodiments. The playbook provides a set of steps that the operator may consult when troubleshooting the alert, and the user has the option of providing a playbook when creating an alert monitor. Additionally, the system may also provide playbooks for certain types of events, and the user may select a recommended playbook, or the system playbook may be automatically suggested if there is not a user-configured playbook.

In the illustrated example, there are some tips, such as checking to see if a cluster-wide problem or a node problem exists. Additionally, the playbook may point to other playbooks for certain types of problems. If the problem is detected, the playbook may also provide a recommendation, e.g., "If the problem is isolated to one node, restart the node . . . "

Figure 17:
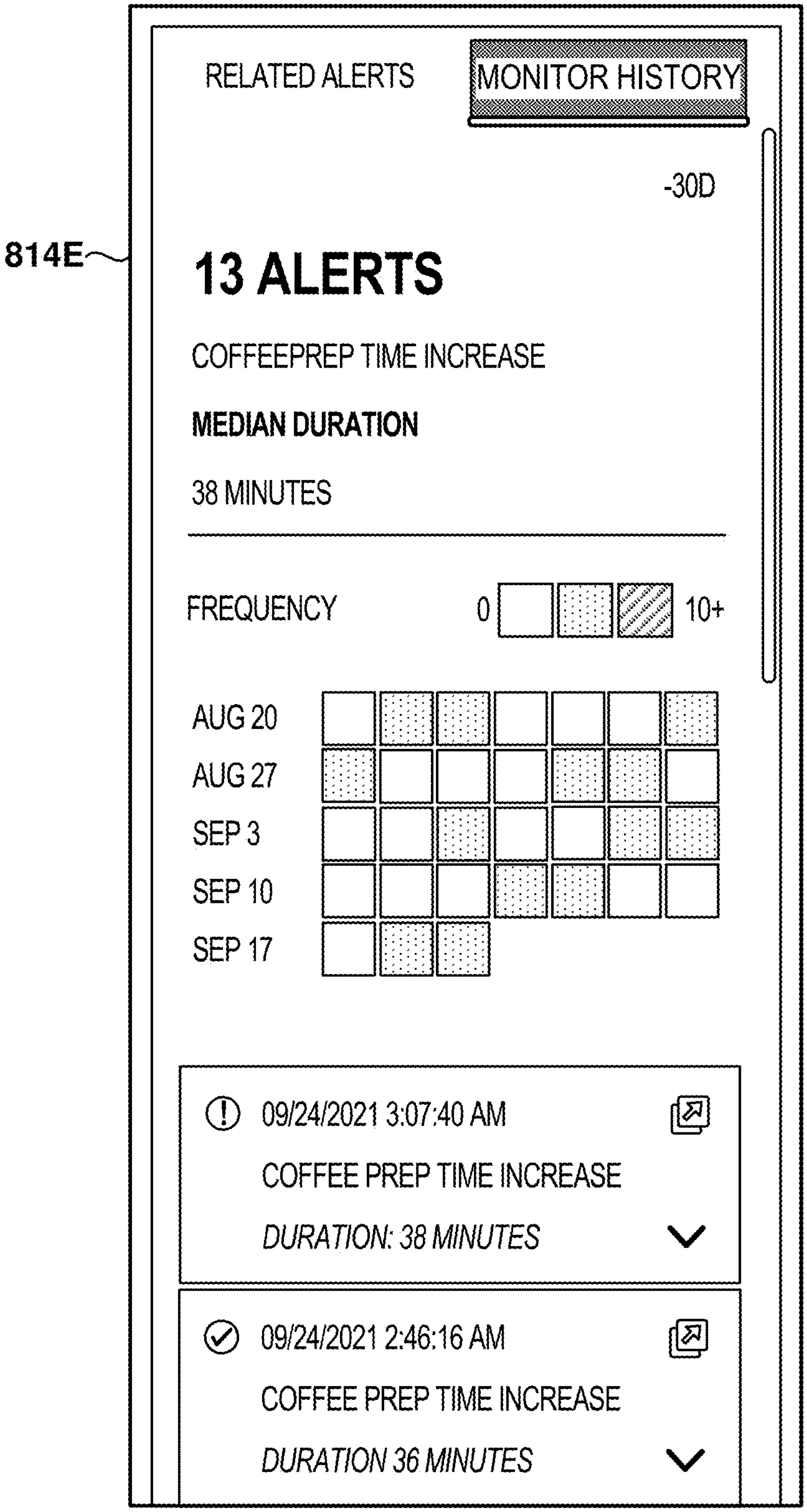
FIG. 17 is a sample user interface for presenting monitor history, according to some example embodiments.

FIG. 17 is a user interface 814E for presenting monitor history, according to some example embodiments. The entity option shows the alerts that were triggered before and after the given alert that happened on the same entity (node, pod, cluster, etc.).

In the illustrated example, a chart is provided with the previous alerts by date and duration. Further, a list with the description of the alerts is also provided.

The chart assists the operator in determining if the problem is new or has been happening before. If the problem has happened before, the operator may check how the problem was solved, e.g., by operator intervention or the problem disappeared without intervention. Additionally, presenting the time diagram may assist the operator in finding time-related problems, such as a service slow down at a certain time of the day when there is more traffic on the website.

Figure 18:
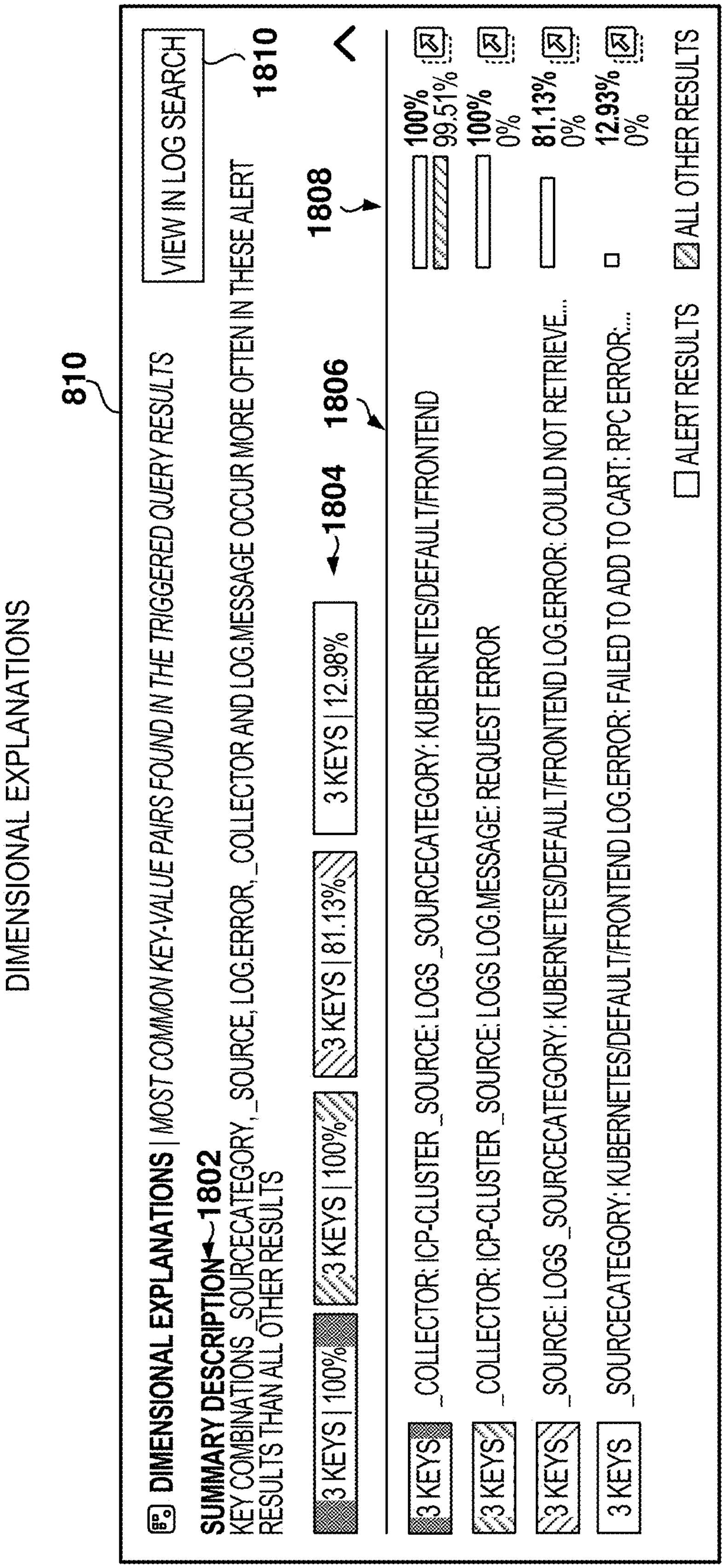
FIG. 18 is a sample user interface for dimensional explanations, according to some example embodiments.

FIG. 18 is a user interface for dimensional explanations 810, according to some example embodiments. The dimensional explanations 810 card analyzes log data and surfaces dimensions or key-value pairs that drove to an alerting state. A dimension refers to one of the facets associated with the log, such as the names of keys.

The dimensional explanations 810 card has a description of the information presented, e.g., "Most common key-volume pairs found in the triggered query results." A summary description 1802 follows with a summary of the dimensions involved. In the illustrated example, dimensions of interest include key combinations of several keys: _sourcecategory, _source, log.error, _collector and log.messages. The summary description 1802 recites, "Key combinations sourcecategory, _source, log.error, _collector and log.message occur more often in these alerts than all other results."

Thus, the analysis is performed not just simply dimension by dimension (e.g., key by key), but the analysis also looks at combinations of dimensions that occur more often when the problem associated with the alert takes place.

Section 1804 shows groupings of the discovered key-value pairs by the count of keys and the percentage of log messages found with the key. In this example, there are four groupings: the first one with three keys happening 100% of the time, a second combination of three keys happening 100% of the time, a third combination of three keys happening 81% of the time, and a fourth combination of three keys happening 13% of the time.

Area 1806 shows a line for each of the groupings with the key-value pairs in each group and additional information with a histogram 1808 showing how many log messages with the key-value pair caused the alert (top bar) and how many did not cause (bottom bar) the alert (e.g., for the first grouping, 100% and 99.51%). To the right, a button is provided to open a LogSearch tool filtered to the Log messages that mapped to the corresponding signature. Further, an option 1810 is provided to open the log query that populated the card, in the log search page.

The use of dimensions assists in finding explanations for the problem. Using an analogy of a vaccine, the vaccine may be tested on different groups of people, according to age, gender, race, geographic location, etc. The results of the vaccine may be analyzed for the different groups to find out how efficient is the vaccine for each group and for intersections of groups, e.g., the vaccine works well for men over sixty.

In the log environment, identifying the dimensions that affect the problem provides solid clues on what is the origin of the problem, e.g., a high frequency of error messages for pods in a certain cluster. However, finding the right combination of dimensions that affect the problem can quickly become a daunting task, as the number of combinations growths exponentially with the number of dimensions considered. It would be quite difficult for an engineer to explore more than a handful of groupings. However, the alert response system analyzes the large number of possible combinations to identify those combinations that fit into the solution. This information can quickly guide the operator to the root of the problem without having to manually investigate different groupings.

Figure 19:
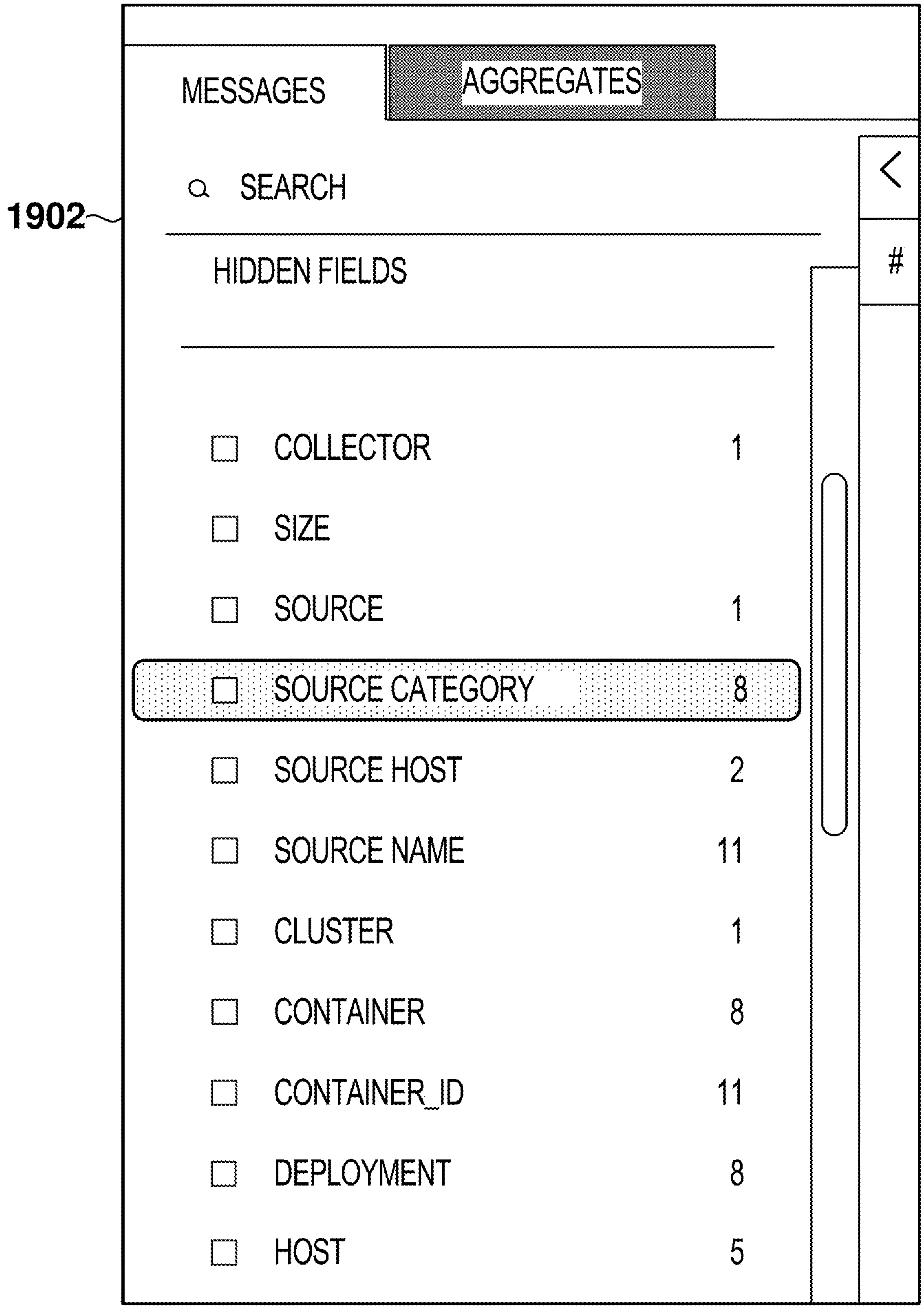
FIG. 19 is a sample user interface for selecting dimensions.

FIG. 19 is a user interface 1902 for selecting dimensions. The user interface 1902 shows an example of dimensions, such as collector, size, source, source category, source host, etc. In some example embodiments, the user is able to configure one or more dimensions to generate groups and then analyze the behavior of the group.

Figure 20:
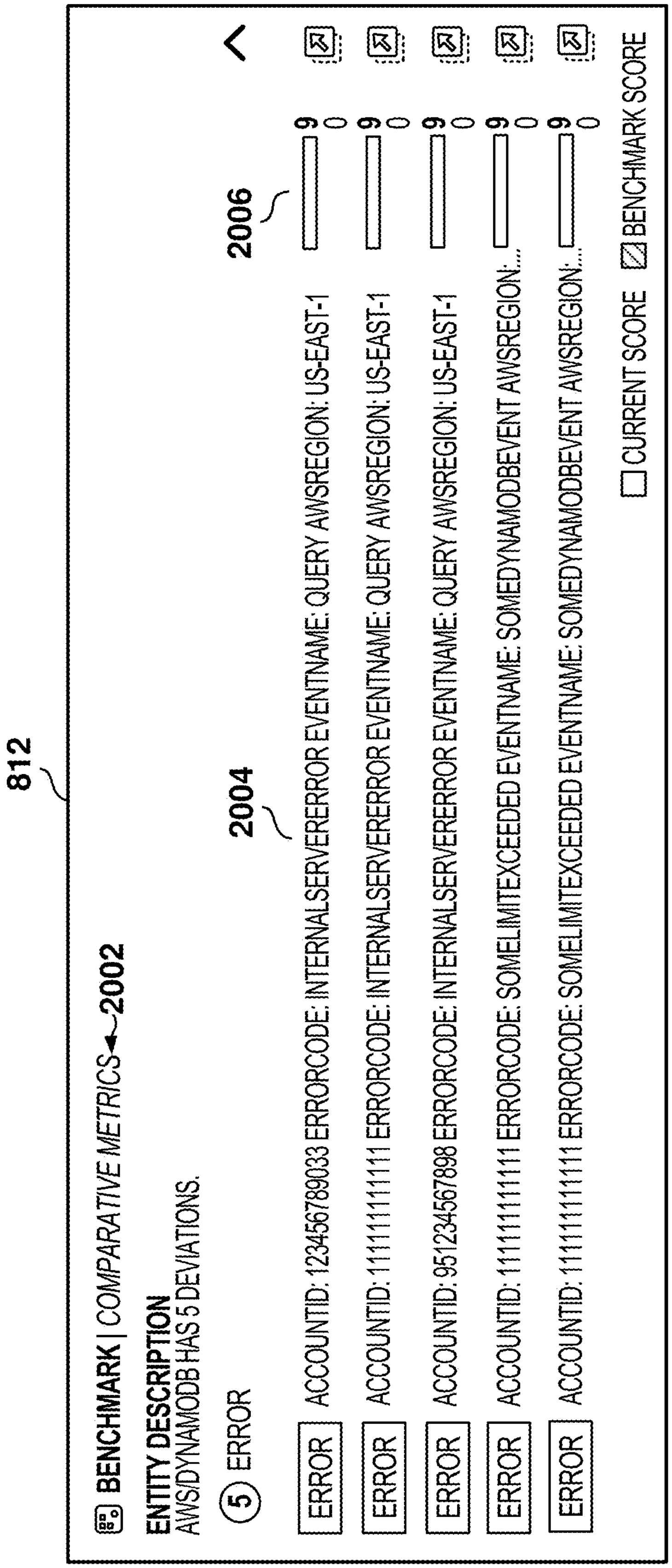
FIG. 20 is a sample user interface for presenting benchmark information, according to some example embodiments.

FIG. 20 is a sample user interface for presenting benchmark 812 information, according to some example embodiments. Benchmarks refer to baselines computed from anonymized and aggregated telemetry data, such as in AWS domains. If the telemetry values for one entity during an alert period are unusual compared to benchmarks, there may be an unusual configuration change or other backend issues.

The top of the card includes a description of the page (e.g., "Comparative metrics"), entity information 2002 (e.g., "aws/dynamodb has 5 deviations"), and the count of unusual benchmarks by signal type.

Section 2004 includes an entry for each deviation found (e.g., error) with dimensional detail of the unusual telemetry value, and a histogram 2006 comparing the telemetry value (top bar) against benchmarks computed from other users (bottom bar). Also, a clickable option is provided to open a log search filtered to the log messages that match the dimensional details of the telemetry value.

In the illustrated example, benchmark 812 shows that the error code InternalServerError is happening nine times for the user but zero times for other user accounts. This AWS error pertains to AWS API calls that are failing at a higher rate than what is expected based on cross-customer baselines. This particular error implies an AWS incident affecting the particular AWS resource type and API.

Figure 21:
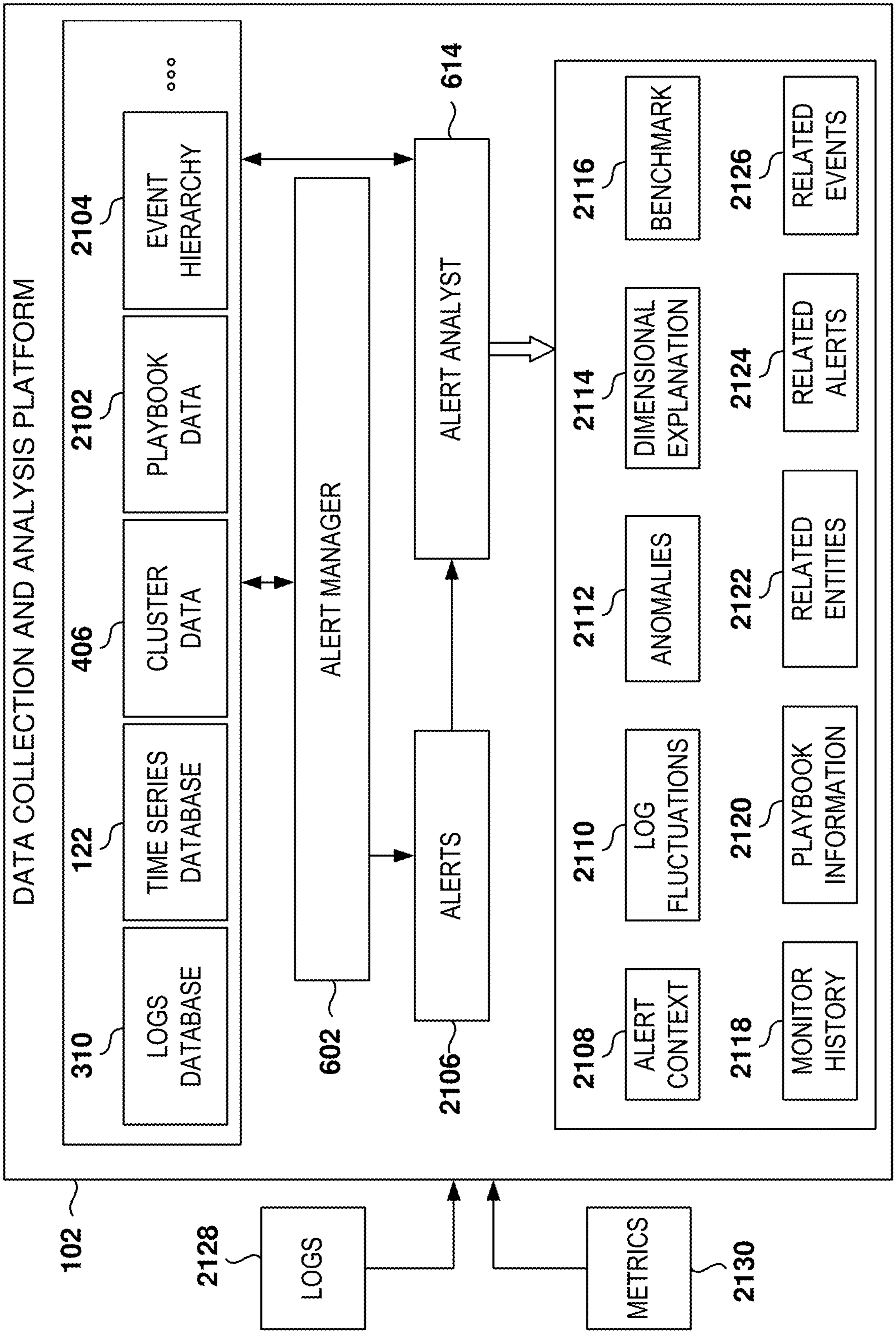
FIG. 21 is an architecture for generating alert-response information, according to some example embodiments.

FIG. 21 is an architecture for generating alert-response information, according to some example embodiments. As discussed above, the data collection and analysis platform 102 continuously collects information (logs 2128 or metrics 2130) and analyzes, classifies, and stores the information. For example, the data collection and analysis platform 102 stores the data in the logs database 310 or time series database 122. Further, the signatures of incoming logs are analyzed to generate cluster data 406, the playbook data 2102 is generated, the event hierarchy 2104 updated, etc.

The incoming logs 2128 and metrics 2130 are processed for storage and generation of information, and also processed by the alert manager 602 to detect problems and generate alerts 2106. Another type of source data may include traces (not shown).

Once an alert 2106 is generated, the alert analyst 614 uses the raw stored information and the curated information to generate information for the response-alert page. As described above, the information for the response-alert page may include one or more of alert context 2108, log fluctuations 2110, anomalies 2112, dimensional explanation 2114, benchmark 2116, monitor history 2118, playbook information 2120, related entities 2122, related alerts 2124, related events 2126, etc. It is noted that the described tools for the alert-response page are examples and do not describe every possible embodiment. Other embodiments may utilize different types of information, combine the information of two tools into one, utilize fewer tools, etc. The embodiments illustrated in FIG. 21 should therefore not be interpreted to be exclusive or limiting, but rather illustrative.

The alert manager 602 may generate an alert 2106 based on a triggered query and a trigger condition. In the example described above for coffee preparation, logs are identified with respect to the monitor condition associated with the trigger for the query. The alert analysis includes measuring conditions when the system was working properly and comparing the conditions to the time associated with the problem. For example, comparing signatures of logs during the time the problem was happening to signatures when the problem was not present.

There may be tens, hundreds, or even thousands of possible patterns of behavior, and the alert analyst 614 has to determine the relevance of each of the patterns, a process that would take hours, days, or even weeks for an operator to perform manually.

The alert analyst 614 searches for particular behaviors that differ from the non-problem period (referred to as background period) to the problem period. Once the behaviors are identified, the alert analyst 614 starts analyzing data to find explanatory factors for the alert in order to troubleshoot the problem and provide guidance on how to solve it, such as with a playbook. The results of the analysis are ranked based on relevance and filtered to present the best information to the user.

For the example of the coffee preparation, the logs from the background period where the latency is less than 1 are compared to the logs during the alert period where the latency is greater than or equal to 1.

For log fluctuations 2110, the patterns are analyzed, and the patterns of interest are placed into categories (e.g., new, gone, and diff as described above with reference to FIG. 11). Similarly, the other contextual panels are analyzed for the relevant troubleshooting information they provide.

In some example embodiments, the time of the onset of the alert is identified and used for the alert analysis. For example, for log fluctuations 2110, the alert analyst 614 extracts the logs associated with the alert and compares to the logs in a previous period, such as by clustering the logs and comparing the logs before and after the alert was triggered.

If the query is for a metric, then the alert analyst 614 may use entity information. The data collection and analysis platform 102 is continuously detecting and cataloging entities identified in the environment (e.g., based on rules). For example, data that matches a certain pattern identified in a rule is formatted according to the rule parameters to identify entities. These entities can be matched against other known-entity types and schemas, and the entities are cataloged and stored in an entity database according to the event hierarchy 2104.

For example, based on an entity identified for the alert, the related entities are analyzed to determine their behavior and generate the information for the anomalies 2112.

In some example embodiments, the alert query is reverse engineered for determining the entities associated with the alert. That is, rules may be used to extract the entities associated, directly or indirectly, with the alert query. Once the entities are identified, the event hierarchy 2104 may be used to select related entities to be part of the alert analysis.

For example, if there is a first microservice known to invoke a second microservice because of data extracted from tracing, then the first microservice will be related to the second microservice. Or, if a third and fourth microservices are attached to the same pod, then the third and fourth microservices will be considered related entities. For example, a CPU metric measure CPU usage and a memory metric measures memory usage from the same entity (e.g., host), then the CPU metric and the memory metric are related because they are physically co-located on the same machine.

The alert analyst 614 utilizes different machine-learning models, or other methods such as rule-based algorithms, to calculate relevance scores for the results, e.g., how relevant the fluctuations are for one entity when compared to another, how often a cluster appears during the problem period, how related a past alert is to the alert being analyzed, etc. The models may give more importance to some features than others based on past experience for solving problems associated with alerts. In some example embodiments, the log fluctuations 2110 utilizes a machine-learning model for clustering based on the log signatures.

In some example embodiments, anomalies 2112 are analyzed based on the entities identified that are relevant to the alert directly, or that are related to the entities for the alert query. The logs 2128 and metrics 2130 for each entity are analyzed to determine unusual trends. Sometimes, particular types of logs may be weighted more than other logs, such as when a log includes the word "error" or "failure."

Further, detected anomalies for different metrics may be combined, such as when the anomalies are connected in the event hierarchy 2104. For example, the latency of requests to a host has gone up and memory usage on the host has gone up, which are two different metrics with two different anomalies, but because the metrics refer to the same host, the anomalies are merged into a single anomaly. The merging provides more meaningful anomalies than if the combined anomalies were to connect disparate, unexpected, or unexplained behaviors automatically to troubleshoot the problem faster.

For dimensional explanation 2114, the idea is to compare a healthy component to a similar unhealthy component. For example, if some hosts are failing and other hosts are not failing, what are the differences between the hosts? The search for dimensions that explain the problem includes testing different combinations of dimensions and then comparing the metrics for the healthy and unhealthy hosts.

For example, are all the failing hosts in the same data center? If the answer is yes, then troubleshooting is narrowed to the failing data center, or the system may detect that the failing group of hosts have an updated version of a software program.

The analysis for the dimensional explanation 2114 includes comparing performance metrics for each group of dimensions, that is, if a group has a first value for a dimension and the other group has a different value, are the performance metrics difference? If so, how much? This is evaluated by providing a relevance score to the difference.

Thus, the dimensional explanation 2114 analysis automatically searches for the relevant dimension groups, ranks and scores each group for relevance (e.g., deviation from the norm, statistical analysis) to find the most statistically unexpected values.

An example of entity analysis relates to a Kubernetes implementation, an orchestration framework for largely containerized workloads that helps users deploy and manage workloads in cloud environments. The atomic unit of execution in Kubernetes is a pod. The pod is part of a deployment that runs on a cluster, and this forms a hierarchy for Kubernetes.

However, solving problems in the Kubernetes environment may be difficult. For example, a pod is running an application, so the user may have to identify where the pod is running, what is the deployment that created the pod, where is the cluster where the pod is running on, etc. There is a hierarchical address of this pod, which is ultimately again, the atomic, the worker. Further, the pod may be an instance of a microservice, as one app may comprise multiple microservices.

When there is an error, identifying pods, clusters, microservices involved, etc., is an analysis that may extend to many entities so trying to solve the problem manually may be very costly in time and computing resources.

However, by automatically tracking the entities in the system, their relationships, the entity hierarchy, the clusters, the time series, etc., it is possible to automatically uncover the relationships and symptoms associated with a particular alert.

Here is an example of how an operator may solve a problem associated with the alert. The alert-response page is presented with the log fluctuations 806, anomalies 808, and dimensional explanations 810 tiles. By looking at the information, the operator deduces that there are application failures (log errors) happening in communicating with the cart service. Further, the operator sees a correlation with infrastructure issues (e.g., a pod failure) happening on the cart-service.

Both pieces of information together provide a smoking gun. The troubleshooting then begins to narrow down the suspects and get to the root cause. The operator leverages various drill-down buttons or interacts with visualizations on the response-alert page directly. In this example, the operator clicks on an anomaly, drills down to the entity dashboard, in this case the cart service, to understand what is happening.

The operator finds that there is CPU and memory pressure on the cart service, which explains the pod crashes. The operator can provision more resources to fix the CPU and memory pressure problems and the problem is solved.

Figure 22:
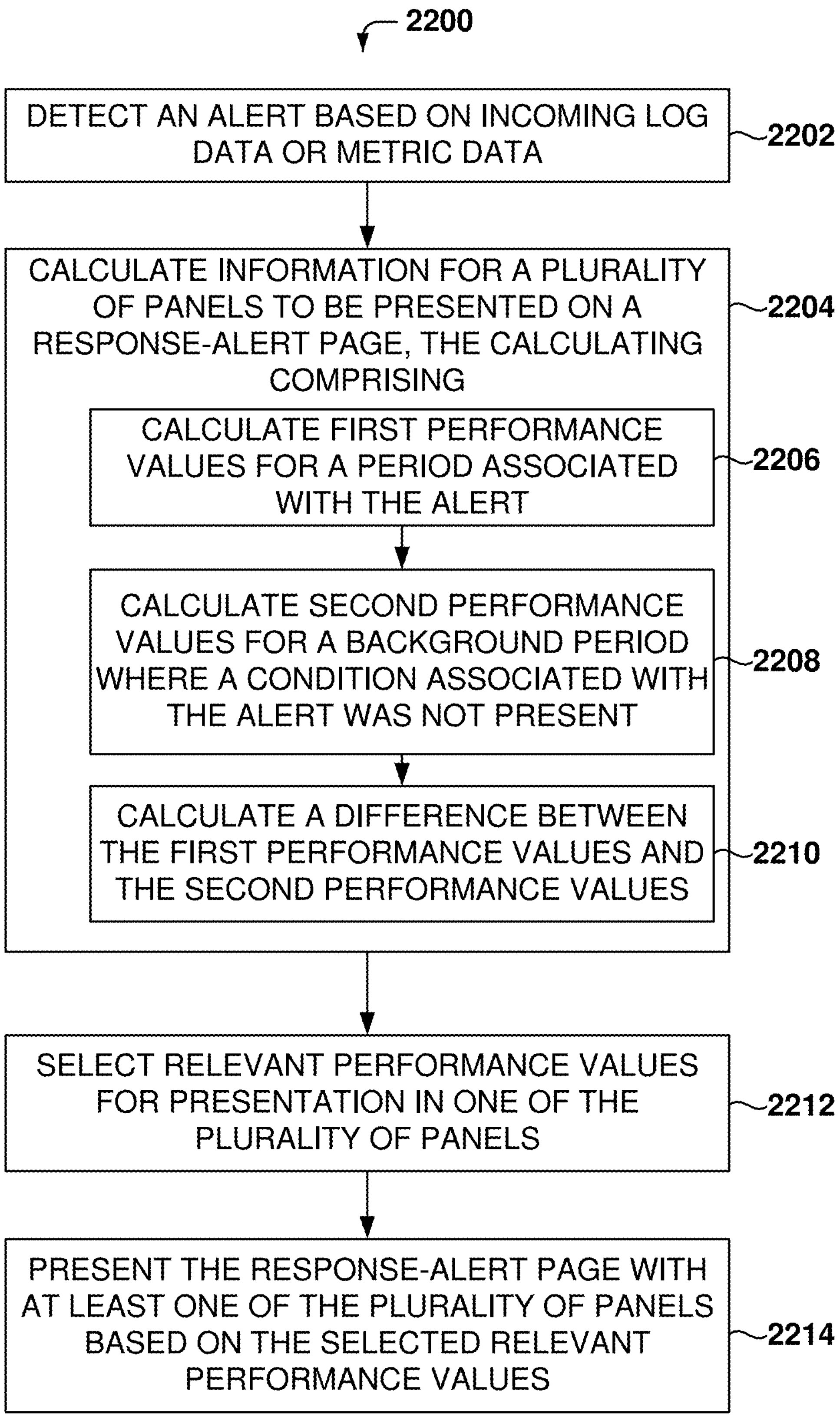
FIG. 22 is a flowchart of a method to generate response information for an alert, according to some example embodiments.

FIG. 22 is a flowchart of a method 2200 to generate response information for an alert, according to some example embodiments. While the various operations in this flowchart are presented and described sequentially, one of ordinary skill will appreciate that some or all of the operations may be executed in a different order, be combined or omitted, or be executed in parallel.

Operation 2202 is for detecting an alert based on incoming log data or metric data.

From operation 2202, the method 2200 flows to operation 2204 for calculating information for a plurality of panels to be presented on a response-alert page. Calculating the information comprises operations 2206, 2208, and 2210.

Operation 2206 is for calculating first performance values for a period associated with the alert.

From operation 2206, the method 2200 flows to operation 2208 to calculate second performance values for a background period where a condition associated with the alert was not present.

From operation 2208, the method 2200 flows to operation 2210 for calculating a difference between the first performance values and the second performance values.

From operation 2204, the method 2200 flows to operation 2212 for selecting, based on the difference, relevant performance values for presentation in one of the plurality of panels From operation 2212, the method 2200 flows to operation 2214 for presenting the response-alert page with at least one of the plurality of panels based on the selected relevant performance values.

In one example, the response-alert page comprising alert information, the alert information comprising: for a metric-related alert, a start time, a duration, a trigger value, a trigger condition, and a chart showing values of a metric associated with the alert; and for a log-related alert, a start time, a duration, a trigger value, a trigger condition, and a chart showing values of a log parameter associated with the alert.

In one example, the response-alert page comprises a log-fluctuations panel for comparing log activity, the log-fluctuations panel comprising an analysis of clusters associated with the alert, the log-fluctuations panel identifying new clusters occurring during the alert period but not before, gone clusters occurring before the alert period and not during the alert period, and clusters with counts changing between the alert period and before the alert period.

In one example, the response-alert page comprises an anomalies panel for presenting relevant events associated with one or more metrics, the anomalies panel based on a comparison of changes in metric values for entities associated with the alert, and related entities.

In one example, the response-alert page comprises a related-entities panel for presenting information of entities related to the entities associated with the alert, the related-entities panel presenting values for one or more metrics of the related entities over time.

In one example, the response-alert page comprises a related-alert panel for presenting information of alerts that are related to the alert before and during the alert period.

In one example, the response-alert page comprises a dimensional-explanations panel for presenting most common key-value pairs occurring in the log data. the dimensional-explanations panel presenting the most common key-value pairs with a percentage of how many log messages with the key-value pair caused the alert.

In one example, the response-alert page comprises a benchmark panel for presenting information comparing values of metrics associated with systems of a user and values of the metrics associated with systems of other users.

In one example, the response-alert page comprises a playbook panel for presenting a playbook with guidelines for solving a problem associated with the alert.

In one example, the method 2200 further comprises presenting a user interface for configuring the alert comprising options for setting a trigger field, at least one trigger condition, and notifications for the alert.

Another general aspect is for a system that includes a memory comprising instructions and one or more computer processors. The instructions, when executed by the one or more computer processors, cause the one or more computer processors to perform operations comprising: detecting an alert based on incoming log data or metric data; calculating information for a plurality of panels to be presented on a response-alert page, the calculating comprising: calculating first performance values for a period associated with the alert; calculating second performance values for a background period where the alert condition was not present; and calculating a difference between the first performance values and the second performance values; selecting, based on the difference, relevant performance values for presentation in one of the plurality of panels; presenting the response-alert page with at least one of the plurality of panels based on the selected relevant performance values.

In yet another general aspect, a tangible machine-readable storage medium (e.g., a non-transitory storage medium) includes instructions that, when executed by a machine, cause the machine to perform operations comprising: detecting an alert based on incoming log data or metric data; calculating information for a plurality of panels to be presented on a response-alert page, the calculating comprising: calculating first performance values for a period associated with the alert; calculating second performance values for a background period where the alert condition was not present; and calculating a difference between the first performance values and the second performance values; selecting, based on the difference, relevant performance values for presentation in one of the plurality of panels; presenting the response-alert page with at least one of the plurality of panels based on the selected relevant performance values.

Figure 23:
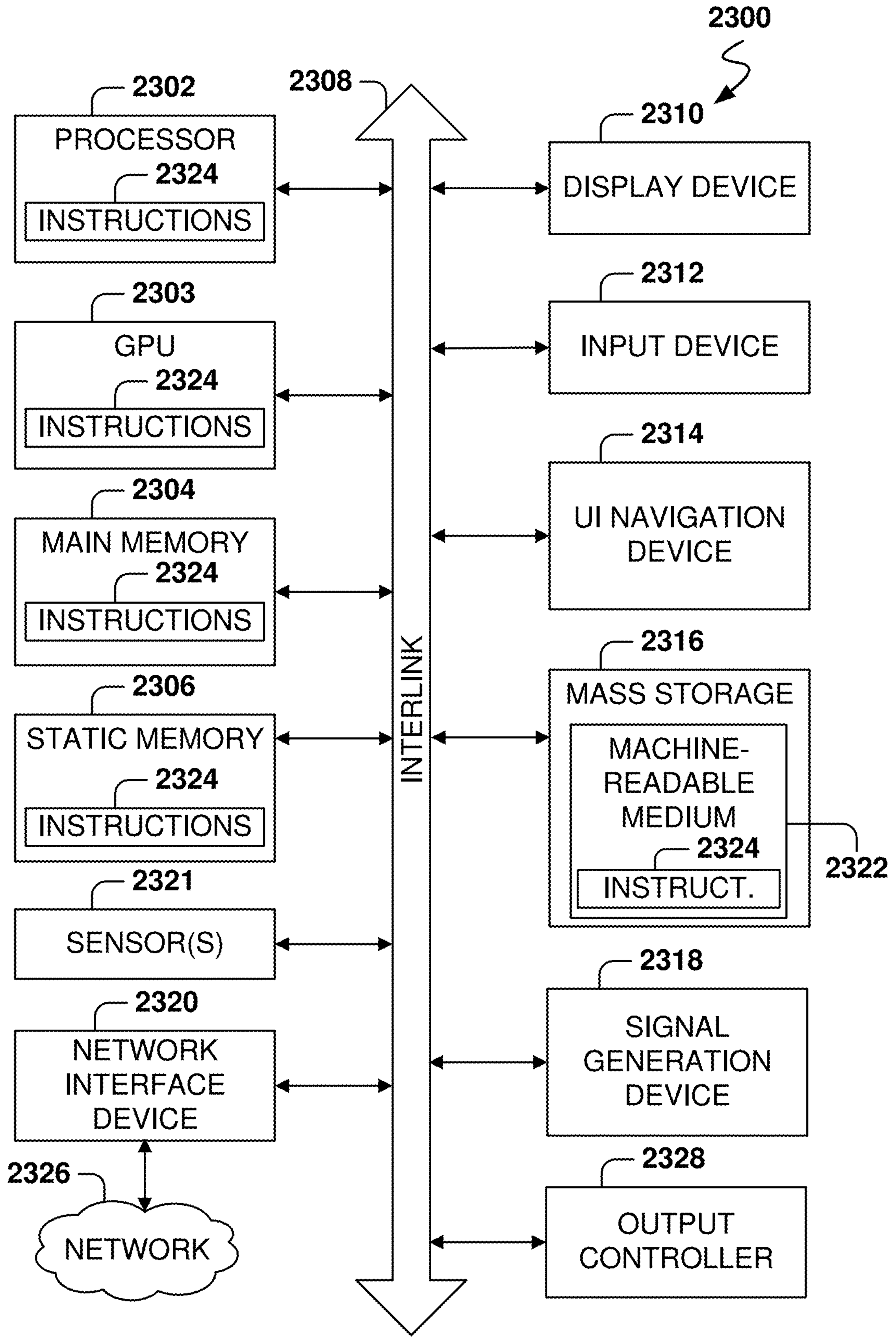
FIG. 23 is a block diagram illustrating an example of a machine upon or by which one or more example process embodiments described herein may be implemented or controlled.

FIG. 23 is a block diagram illustrating an example of a machine 2300 upon or by which one or more example process embodiments described herein may be implemented or controlled. In alternative embodiments, the machine 2300 may operate as a standalone device or may be connected (e.g., networked) to other machines. In a networked deployment, the machine 2300 may operate in the capacity of a server machine, a client machine, or both in server-client network environments. In an example, the machine 2300 may act as a peer machine in a peer-to-peer (P2P) (or other distributed) network environment. Further, while only a single machine 2300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 2300 may include a hardware processor 2302 (e.g., a central processing unit (CPU), a hardware processor core, or any combination thereof), a graphics processing unit (GPU) 2303, a main memory 2304, and a static memory 2306, some or all of which may communicate with each other via an interlink (e.g., bus) 2308. The machine 2300 may further include a display device 2310, an alphanumeric input device 2312 (e.g., a keyboard), and a user interface (UI) navigation device 2314 (e.g., a mouse). In an example, the display device 2310, alphanumeric input device 2312, and UI navigation device 2314 may be a touch screen display. The machine 2300 may additionally include a mass storage device (e.g., drive unit) 2316, a signal generation device 2318 (e.g., a speaker), a network interface device 2320, and one or more sensors 2321, such as a Global Positioning System (GPS) sensor, compass, accelerometer, or another sensor. The machine 2300 may include an output controller 2328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 2316 may include a machine-readable medium 2322 on which is stored one or more sets of data structures or instructions 2324 (e.g., software) embodying or utilized by any one or more of the techniques or functions described herein. The instructions 2324 may also reside, completely or at least partially, within the main memory 2304, within the static memory 2306, within the hardware processor 2302, or within the GPU 2303 during execution thereof by the machine 2300. In an example, one or any combination of the hardware processor 2302, the GPU 2303, the main memory 2304, the static memory 2306, or the mass storage device 2316 may constitute machine-readable media.

While the machine-readable medium 2322 is illustrated as a single medium, the term "machine-readable medium" may include a single medium, or multiple media, (e.g., a centralized or distributed database, and/or associated caches and servers) configured to store the one or more instructions 2324.

The term "machine-readable medium" may include any medium that is capable of storing, encoding, or carrying instructions 2324 for execution by the machine 2300 and that cause the machine 2300 to perform any one or more of the techniques of the present disclosure, or that is capable of storing, encoding, or carrying data structures used by or associated with such instructions 2324. Non-limiting machine-readable medium examples may include solid-state memories, and optical and magnetic media. In an example, a massed machine-readable medium comprises a machine-readable medium 2322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2324 may further be transmitted or received over a communications network 2326 using a transmission medium via the network interface device 2320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

receiving, by a computer server via a computer network, machine data from one or more computer devices, the machine data comprising log data or metric data generated by the one or more computer devices;

detecting an alert based on the machine data;

calculating, by the computer server in response to detecting the alert, a plurality of dimensional explanations associated with the alert, the plurality of dimensional explanations comprising at least one dimensional explanation that is based on a combination of dimensions, each dimension referring to a facet associated with the machine data associated with the alert, wherein calculating the dimensional explanations further comprises:

comparing performance metrics for groups of dimensions; and selecting the plurality of dimensional explanations based on a relevance metric for each group of dimensions;

calculating, for each dimensional explanation, a number of corresponding log messages received by the computer server from the one or more computer devices during a period associated with the alert;

selecting, by the computer server, a subset of dimensional explanations based on the number of log messages associated with each dimensional explanation; and causing presentation, in a computer user interface (UI), of the selected subset of the dimensional explanations.

2. The method as recited in claim 1, further comprising:

providing a configuration UI for selecting dimensions to be used for the dimensional explanations.

3. The method as recited in claim 1, further comprising:

determining related alerts, associated with a same entity as the alert, that were triggered before and after the alert for a predetermined period; and providing a related-alerts UI for presenting the related alerts based on a frequency of the related alerts.

4. The method as recited in claim 1, wherein the dimensions are selected from a group comprising log error, collector, size, source, source category, source host, cluster, container, or host.

5. The method as recited in claim 1, wherein the UI includes groupings of dimensional explanations based on a count of keys in the log messages and a percentage of log messages found with each key.

6. The method as recited in claim 5, wherein the UI provides a histogram for each grouping of dimensional explanations showing how many log messages with a key-value pair caused the alert and how many log messages did not cause the alert.

7. The method as recited in claim 1, further comprising:

causing presentation in the UI of a playbook panel for presenting a playbook with guidelines for solving a problem associated with the alert.

8. The method as recited in claim 1, wherein the UI comprises a log-fluctuations panel for comparing log activity, the log-fluctuations panel comprising an analysis of clusters associated with the alert, the log-fluctuations panel identifying new clusters occurring during the period associated with the alert but not before, gone clusters occurring before the period associated with the alert and not during the period associated with the alert, and clusters with counts changing between the period associated with the alert and before the period associated with the alert.

9. The method as recited in claim 1, further comprising:

determining an entity associated with the alert;

determining related entities associated with the alert; and determining if any of the related entities is associated with an anomaly.

10. A system comprising:

a memory comprising instructions; and one or more computer processors, wherein the instructions, when executed by the one or more computer processors, cause the system to perform operations comprising:

receiving, by a computer server via a computer network, machine data from one or more computer devices, the machine data comprising log data or metric data generated by the one or more computer devices;

detecting an alert based on the machine data;

calculating, by the computer server in response to detecting the alert, a plurality of dimensional explanations associated with the alert, the plurality of dimensional explanations comprising at least one dimensional explanation that is based on a combination of dimensions, each dimension referring to a facet associated with the machine data associated with the alert, wherein calculating the dimensional explanations further comprises:

comparing performance metrics for groups of dimensions; and selecting the plurality of dimensional explanations based on a relevance metric for each group of dimensions;

calculating, for each dimensional explanation, a number of corresponding log messages received by the computer server from the one or more computer devices during a period associated with the alert;

selecting, by the computer server, a subset of dimensional explanations based on the number of log messages associated with each dimensional explanation; and causing presentation, in a computer user interface (UI), of the selected subset of the dimensional explanations.

11. The system as recited in claim 10, wherein the instructions further cause the one or more computer processors to perform operations comprising:

providing a configuration UI for selecting dimensions to be used for the dimensional explanations.

12. The system as recited in claim 10, wherein the instructions further cause the one or more computer processors to perform operations comprising:

determining related alerts, associated with a same entity as the alert, that were triggered before and after the alert for a predetermined period; and providing a related-alerts UI for presenting the related alerts based on a frequency of the related alerts.

13. The system as recited in claim 10, wherein the dimensions are selected from a group comprising log error, collector, size, source, source category, source host, cluster, container, or host.

14. The system as recited in claim 10, wherein the UI includes groupings of dimensional explanations based on a count of keys in the log messages and a percentage of log messages found with each key.

15. The system as recited in claim 10, wherein the UI provides a histogram for each grouping of dimensional explanations showing how many log messages with a key-value pair caused the alert and how many log messages did not cause the alert.

16. A non-transitory machine-readable storage medium including instructions that, when executed by a machine, cause the machine to perform operations comprising:

receiving, by a computer server via a computer network, machine data from one or more computer devices, the machine data comprising log data or metric data generated by the one or more computer devices;

detecting an alert based on the machine data;

calculating, by the computer server in response to detecting the alert, a plurality of dimensional explanations associated with the alert, the plurality of dimensional explanations comprising at least one dimensional explanation that is based on a combination of dimensions, each dimension referring to a facet associated with the machine data associated with the alert, wherein calculating the dimensional explanations further comprises:

comparing performance metrics for groups of dimensions; and selecting the plurality of dimensional explanations based on a relevance metric for each group of dimensions;

calculating, for each dimensional explanation, a number of corresponding log messages received by the computer server from the one or more computer devices during a period associated with the alert;

selecting, by the computer server, a subset of dimensional explanations based on the number of log messages associated with each dimensional explanation; and causing presentation, in a computer user interface (UI), of the selected subset of the dimensional explanations.

17. The non-transitory machine-readable storage medium as recited in claim 16, wherein the machine further performs operations comprising:

providing a configuration UI for selecting dimensions to be used for the dimensional explanations.

18. The non-transitory machine-readable storage medium as recited in claim 16, wherein the machine further performs operations comprising:

determining related alerts, associated with a same entity as the alert, that were triggered before and after the alert for a predetermined period; and providing a related-alerts UI for presenting the related alerts based on a frequency of the related alerts.

19. The non-transitory machine-readable storage medium as recited in claim 16, wherein the dimensions are selected from a group comprising log error, collector, size, source, source category, source host, cluster, container, or host.

20. The non-transitory machine-readable storage medium as recited in claim 16, wherein the UI includes groupings of dimensional explanations based on a count of keys in the log messages and a percentage of log messages found with each key.

* * * * *